United States Patent
Eguchi et al.

(10) Patent No.: US 9,521,316 B2
(45) Date of Patent: Dec. 13, 2016

(54) IMAGE PROCESSING APPARATUS FOR RECONSTRUCTING AN IMAGE, IMAGE PICKUP APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Kaoru Eguchi, Utsunomiya (JP); Koshi Hatakeyama, Tokyo (JP); Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/178,338

(22) Filed: Feb. 12, 2014

(65) Prior Publication Data
US 2014/0226041 A1    Aug. 14, 2014

(30) Foreign Application Priority Data
Feb. 14, 2013   (JP) ................. 2013-026538

(51) Int. Cl.
  *H04N 5/225*   (2006.01)
  *H04N 5/232*   (2006.01)
  *G06T 5/00*    (2006.01)
(52) U.S. Cl.
  CPC .......... *H04N 5/23229* (2013.01); *G06T 5/003* (2013.01); *H04N 5/2254* (2013.01); *H04N 5/2258* (2013.01); *H04N 5/23212* (2013.01)

(58) Field of Classification Search
  CPC  H04N 5/23329; H04N 5/2254; H04N 5/2258; H04N 5/23212
  (Continued)

(56) References Cited

U.S. PATENT DOCUMENTS 7,418,150 B2   8/2008  Myoga
8,493,476 B2   7/2013  Yonaha et al.
(Continued)

FOREIGN PATENT DOCUMENTS

CN   101953153 A   1/2011
JP   2005229198 A  8/2005
(Continued)

OTHER PUBLICATIONS

Ng, Ren, et al., "Light Field Photography with a Hand-held Plenoptic Camera", 2005 Computer Science Technical Report CTSR, pp. 1-11.
(Continued)

*Primary Examiner* — Gevell Selby
(74) *Attorney, Agent, or Firm* — Rossi, Kimms & McDowell LLP

(57) ABSTRACT

An image processing apparatus generates an output image using an input image including object space information, the image processing apparatus includes a region dividing unit configured to divide the input image into a first region and a second region, and a reconstructed image generating unit configured to reconstruct the input image to generate the output image, and the reconstructed image generating unit applies different shooting conditions from each other to the first region and the second region respectively.

20 Claims, 17 Drawing Sheets

(58) Field of Classification Search
USPC .............................. 348/222.1, 346, 239, 370
See application file for complete search history.

(56) References Cited

U.S. PATENT DOCUMENTS

| | | | |
|---|---|---|---|
| 8,988,542 B2 * | 3/2015 | Saito .............................. | 348/239 |
| 2003/0071905 A1 * | 4/2003 | Yamasaki ..................... | 348/239 |
| 2005/0195317 A1 * | 9/2005 | Myoga .......................... | 348/370 |
| 2009/0160963 A1 | 6/2009 | Kim | |
| 2011/0292234 A1 * | 12/2011 | Mitsumoto .......... | H04N 5/2621 |
| | | | 348/222.1 |
| 2012/0229691 A1 * | 9/2012 | Hiasa ................... | H04N 5/2355 |
| | | | 348/340 |
| 2012/0257068 A1 * | 10/2012 | Imai .............................. | 348/346 |

FOREIGN PATENT DOCUMENTS

| | | |
|---|---|---|
| JP | 2011-211291 A | 10/2011 |
| JP | 2011-211523 A | 10/2011 |

OTHER PUBLICATIONS

Ng, Ren; "Fourier Slice Photography", 2005 ACM Trans. Graph.24, pp. 735-744.
Office Action issued in Chinese Patent Application No. CN201410050633.3, mailed Oct. 9, 2016. English translation provided.

\* cited by examiner

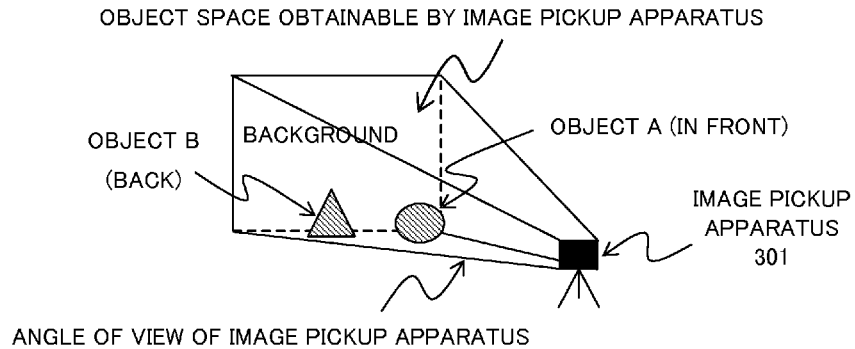
FIG. 1
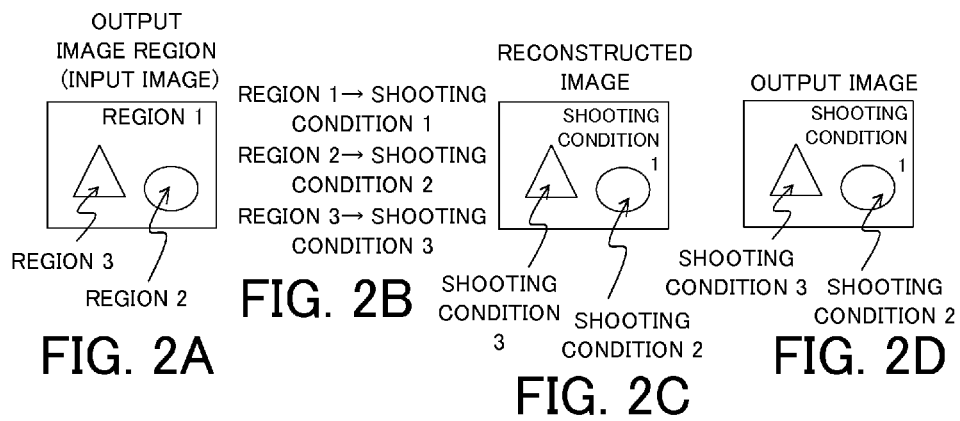
FIG. 2A
FIG. 2B
FIG. 2C
FIG. 2D
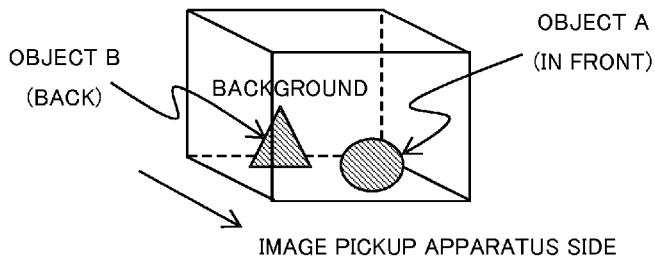
FIG. 3

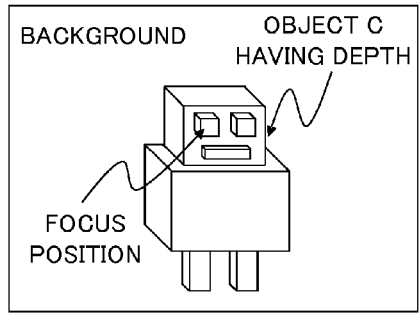 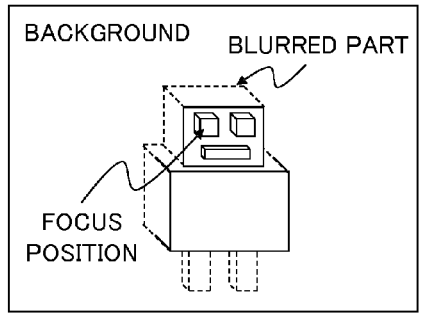
FIG. 8A        FIG. 8B
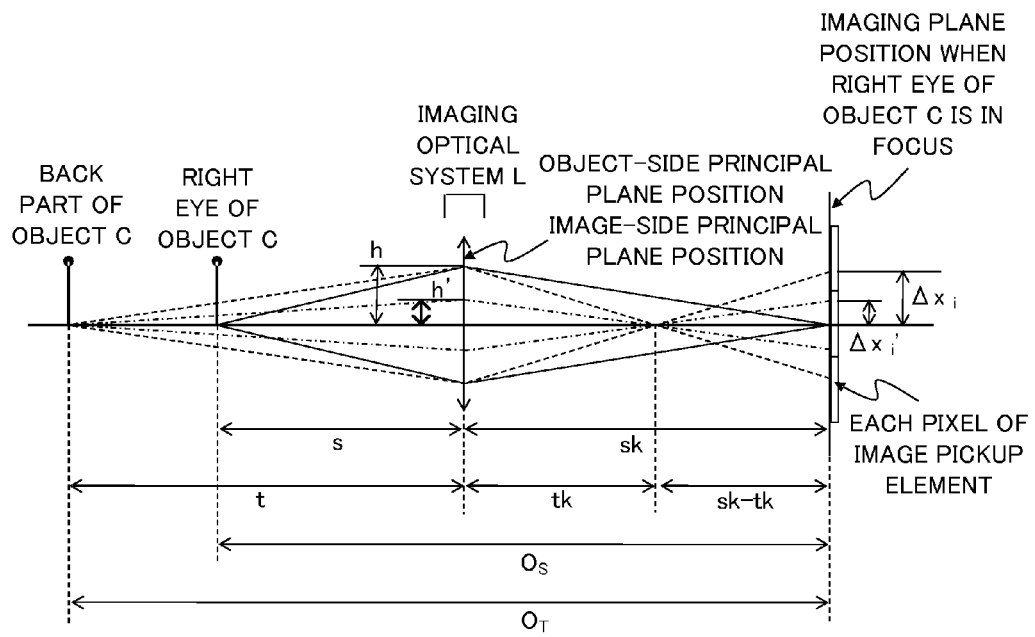
FIG. 9

IMAGE PROCESSING APPARATUS FOR RECONSTRUCTING AN IMAGE, IMAGE PICKUP APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image pickup apparatus which obtains the two-dimensional intensity distribution of light and angle information of light rays in an object space and an image processing apparatus which generates a reconstructed image from images obtained by such an image pickup apparatus.

Description of the Related Art

In recent years, there have been proposed image pickup apparatuses which perform an operation on data obtained by an image pickup element and perform digital image processing according to the resulting data, thereby outputting various images. The literature of "Ren Ng, et al., "Light Field Photography with a Hand-held Plenoptic Camera", 2005 Computer Science Technical Report CTSR" discloses an image pickup apparatus which obtains the two-dimensional intensity distribution of light and angle information of light rays in an object space at the same time using "Light Field Photography". Here, the two-dimensional intensity distribution of light and angle information of light rays are together called a light field, and three-dimensional information in the object space can be obtained by obtaining the light field. In such an image pickup apparatus, it is possible to obtain the light field and, after the image is shot, to perform image processing, thereby changing (adjusting) the focus position, photographing viewpoint, depth of field, etc., of an image, called refocus.

Meanwhile, as to photograph expressions, ones where the main object stands out by intentionally blurring the foreground and background in portrait photography and macro photography of a flower, an insect, etc., are preferred. When aiming for such a photograph expression, in order to obtain a beautiful background blur, the object is often photographed with an image pickup apparatus having a shallow depth of field. However, while a beautiful background blur is obtained using a lens having a shallow depth of field, if the object itself has a depth, the entire object cannot be photographed clearly, resulting in part of the object being blurred. If the object is photographed with a deeper depth of field in order to prevent this, a beautiful blur is not obtained. As such, with conventional image pickup apparatuses, the background blur and depth of field cannot be controlled independently.

Japanese Patent Laid-open No. 2011-211523 discloses a configuration where with changing the focus position, a plurality of images are shot, thereby performing a blur control.

However, in the configuration of Japanese Patent Laid-open No. 2011-211523, a plurality of images need to be picked up, and hence, for example, when a fast moving object such as an insect is photographed, because of the differences in a shooting time between the plurality of images, the positions of the moving object included respectively in the plurality of images are different. Thus, it may be difficult to perform blur control using a plurality of shot images.

SUMMARY OF THE INVENTION

The present invention provides an image processing apparatus, an image pickup apparatus, an image processing method, and a non-transitory computer-readable storage medium which are capable of applying different shooting condition values from each other to a plurality of regions in an image to generate a reconstructed image.

An image processing apparatus as one aspect of the present invention generates an output image using an input image including object space information, the image processing apparatus includes a region dividing unit configured to divide the input image into a first region and a second region, and a reconstructed image generating unit configured to reconstruct the input image to generate the output image, and the reconstructed image generating unit applies different shooting conditions from each other to the first region and the second region respectively.

An image pickup apparatus as another aspect of the present invention includes an imaging optical system, an image pickup element including a plurality of pixels, a lens array configured such that rays from the same position of an object plane are incident on different pixels of the image pickup element depending on a pupil region of the imaging optical system through which the ray passes, a region dividing unit configured to divide an input image into a first region and a second region, and a reconstructed image generating unit configured to reconstruct the input image to generate an output image, the reconstructed image generating unit applying different shooting conditions from each other to the first region and the second region respectively, and the lens array is disposed in an image-side conjugate plane of the imaging optical system with respect to the object plane.

An image pickup apparatus as another aspect of the present invention generates an output image using an input image including object space information, the image pickup apparatus includes an imaging optical system, an image pickup element including a plurality of pixels, a lens array configured such that rays from the same position of an object plane are incident on different pixels of the image pickup element depending on a pupil region of the imaging optical system through which the ray passes, and the image processing apparatus, and the lens array is disposed in an image-side conjugate plane of the imaging optical system with respect to the object plane.

An image pickup apparatus as another aspect of the present invention generates an output image using an input image including object space information, the image pickup apparatus includes an imaging optical system, an image pickup element including a plurality of pixels, a lens array configured such that rays from the same position of an object plane are incident on different pixels of the image pickup element depending on a pupil region of the imaging optical system through which the ray passes, and the image processing apparatus, and the lens array is disposed such that the image pickup element is conjugate with an image-side conjugate plane of the imaging optical system with respect to the object plane.

An image pickup apparatus as another aspect of the present invention generates an output image using an input image including object space information, the image pickup apparatus includes an imaging optical system including a plurality of optical systems having a positive refractive power, at least one image pickup element including a plurality of pixels, and the image processing apparatus, the plurality of optical systems are arrayed such that rays from the same position of an object plane are incident on different pixels of the image pickup element depending on a pupil region of the imaging optical system through which the ray passes, and a pupil of the imaging optical system is a combined pupil that is obtained by combining pupils of the plurality of optical systems.

An image processing method as another aspect of the present invention generates an output image using an input image including object space information, and the image processing method comprising the steps of dividing the input image into a first region and a second region, and reconstructing the input image to generate the output image, the input image being reconstructed by applying different shooting conditions from each other to the first region and the second region respectively.

A non-transitory computer-readable storage medium as another aspect of the present invention stores an image processing program which generates an output image using an input image including object space information, and the image processing program causes an information processing apparatus to execute the steps of dividing the input image into a first region and a second region, and reconstructing the input image to generate the output image, the input image being reconstructed by applying different shooting conditions from each other to the first region and the second region respectively.

A non-transitory computer-readable storage medium as another aspect of the present invention stores an image processing program, and the image processing program causes an information processing apparatus to execute an image obtaining step of obtaining an input image including first, second, and third images shot in first, second, and third shooting conditions different from each other, a shooting condition setting step of setting the first shooting condition for a first region of an output image and the second shooting condition for a second region, and a combining step of combining the first image corresponding to the first region, the second image corresponding to the second region, and the third image corresponding to a third region between the first region and the second region, the third image being based on the third shooting condition between the first shooting condition and the second shooting condition.

Further features and aspects of the present invention will become apparent from the following description of exemplary embodiments with reference to the attached drawings.

BRIEF DESCRIPTION OF THE DRAWINGS

FIG. 1 is an example of photographing a scene which includes objects A and B and a background in each of embodiments.

FIGS. 2A-2D are diagrams of describing image processing of obtaining an output image from an input image in each of the embodiments.

FIG. 3 is a photographing scene for describing a method of determining a boundary processing range in each of the embodiments.

FIGS. 8A and 8B are diagrams of describing a method of determining a boundary processing range in each of the embodiments.

FIG. 9 is a diagram of describing a method of calculating a blur spread amount $\Delta x_i$ in each of the embodiments.

DESCRIPTION OF THE EMBODIMENTS

Figure 4:
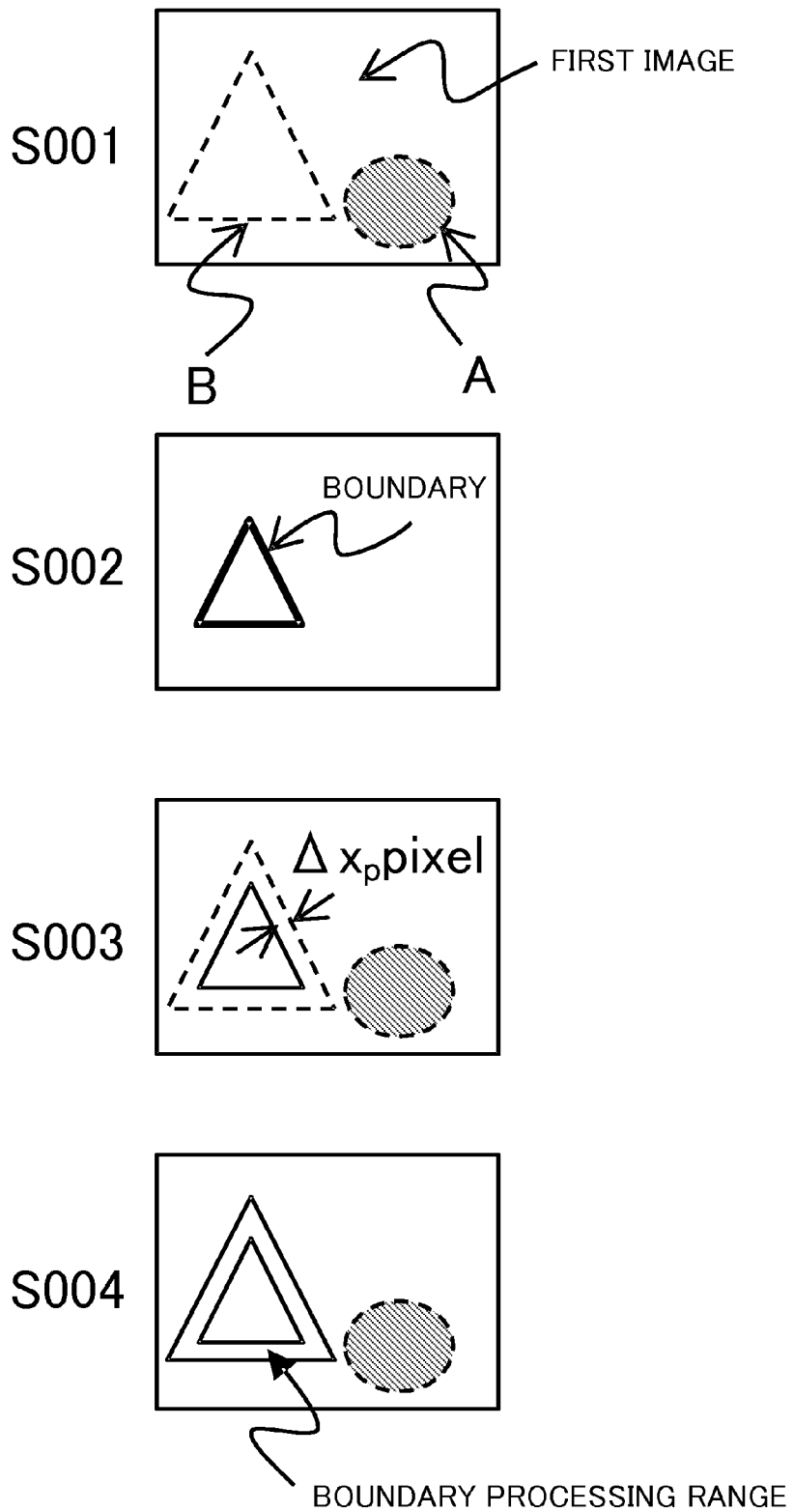
FIG. 4 is a diagram of describing a method of determining a boundary processing range in each of the embodiments.

Exemplary embodiments of the present invention will be described below with reference to the accompanied drawings. In each of the drawings, the same elements will be denoted by the same reference numerals and the duplicate descriptions thereof will be omitted.

In the present embodiment, "object space information" is information including information about the two-dimensional intensity distribution of light emitted from an object and angle information of each of rays emitted from the object and led to an image pickup element. Or the "object space information" has the same meaning as a "light field". When an image in which an object is captured from a specific viewpoint is referred to as a viewpoint image, an image pickup apparatus capable of obtaining the object space information from a plurality of viewpoint images is also called a "light field camera". The light field camera can obtain an image including the plurality of viewpoint images by one image-pickup operation. That is, an "input image including object space information" is an image including the plurality of viewpoint images.

First of all, as an image pickup apparatus which obtains an input image (input image information) in the present embodiment, a configuration of the image pickup apparatus capable of simultaneously obtaining the plurality of viewpoint images will be described. The input image applied to an image processing method (an image processing program) in the present embodiment is an image obtained with use of the image pickup apparatus (the light field camera) described above. This image pickup apparatus has a plurality of imaging optical systems arranged or a lens array disposed on an image side of the imaging optical system, thereby the image pickup apparatus is capable of obtaining the object space information. In the present embodiment, the "input image information" is image information obtained from a plurality of viewpoints, that is, image information configured by arranging the plurality of viewpoint images. And the "input image" is an image formed from the "input image information". In the present embodiment, as described below, the "input image" including the object space information or the "input image information" is used (reconstructed) to generate an output image.

Image pickup optical systems illustrated in FIGS. 13 to 16 are examples of an image pickup optical system which constitutes this image pickup apparatus. In the present embodiment, the image pickup optical system includes an imaging optical system and an image pickup element, and also includes a lens array if the image pickup optical system has the lens array. A person or an object does not necessarily need to be on an object plane 201 illustrated in FIGS. 13 to 16. This is because focusing can be performed onto the person or the object existing at the back or in front of the object plane 201 by a reconstruction process described below even after an image is shot.

The "reconstruction" is to select or rearrange information of each pixel obtained from the input image (the input image information) so as to obtain a desired output image. It also includes performing an operation on each of information of the pixels as needed, as well as selecting or rearranging the information of each of the pixels. Hence, the input image itself does not need to be a so-called photograph image, in which a person can recognize the object, but the output image generated through a reconstruction process complying with certain rules need only be a desired image.

A "shooting condition" is information about a shooting condition represented by a focus position, a depth of field, exposure, or the like. With a conventional camera, the shooting condition cannot be changed after the image is shot, but with the light field camera, the shooting condition can be changed. A method of changing the shooting condition varies depending on the configuration of the image pickup apparatus described below. In the case of a configuration like a camera array, the shooting condition may be actually changed for each camera. In the case of a configuration where a lens array is contained in one imaging optical system, a virtual imaging plane position, virtual depth of field, virtual exposure, or the like may be used as shooting conditions as described later, and these may be changed.

The "virtual imaging plane position" is a virtual imaging plane position that is taken into account when focusing is performed anew by a refocus operation described below. A "virtual depth of field" is an arbitrary F-number determined virtually. The F-number is determined by a focal length and a pupil diameter of the optical system, and a method of determining the virtual depth of field is the same as the conventional method of calculating the F-number. An image having a depth of field corresponding to a desired F-number is obtained not by driving an actual aperture stop mechanism to control a light beam but by selecting pixels corresponding to the F-number light beam to be obtained in the input image to reconstruct the input image.

The "virtual exposure" is a value, as a virtual exposure value, representing brightness (luminance value) that is to be achieved in the output image. If the reconstruction process is performed on the entire image under the same conditions, then the exposure value is uniform across the entire image (the same shutter speed, F-number, ISO sensitivity) as disclosed in the literature of Ren Ng, et al., "Light Field Photography with a Hand-held Plenoptic Camera", 2005 Computer Science Technical Report CTSR, or Japanese Patent Laid-open No. 2011-211523. However, by partially changing weighting at reconstruction and performing the reconstruction process, the effect can be obtained that the image looks as if it had been picked up under exposure conditions different for its parts.

The "input image information" or "input image" is image information (an image) obtained by simultaneously obtaining the plurality of viewpoint images using the image pickup apparatus including the image pickup element and the imaging optical system, which includes the object space information. As described below, a region dividing unit divides the input image (an output image region) into a plurality of regions (a first region and a second region). The "output image region" (the input image) is a two-dimensional region (an image) determined by a desired size of an image to be finally output. A reconstructed image generating unit applies, to two divided regions (the first region and the second region) of the plurality of divided regions, different shooting conditions from each other obtained based on the input image, thereby reconstructing the input image to generate the output image.

Subsequently, referring to FIGS. 1 and 2A to 2D, these steps will be described. FIG. 1 is an example of the photographing of a scene including objects A and B and a background using an image pickup apparatus 301. FIGS. 2A to 2D are diagrams of describing image processing of obtaining the output image from the input image (input image information) in the present embodiment.

With a conventional camera, if one attempts to sharply photograph both the objects A and B with leaving a beautiful background blur as it is, nothing more than focusing onto only one of the two can be done. Or if the objects A and B are sharply photographed by focusing onto either of the two and increasing the depth of field by, e.g., increasing the F-number, the background blur will be lost. In contrast, with the input image (the input image information) obtained with use of the light field camera of the present embodiment, this problem can be solved by the reconstruction process after the image is shot.

First of all, the output image region (the input image) is divided into arbitrary regions (regions 1, 2, and 3) as illustrated in FIG. 2A. In the present embodiment, any two of these three regions correspond to the first and second regions. A user can specify the divided regions. Or the image pickup apparatus may automatically divide the region using an object recognizing unit (face recognition, etc.) that is a conventional art. If an image as a reference is necessary for a user to divide the region while watching an image, an image temporarily reconstructed from a shot image or the like under a shooting condition at the time of shooting the image may be outputted to be previously displayed on a monitor of the image pickup apparatus or a PC monitor during an editing process.

Next, as illustrated in FIG. 2B, shooting conditions (shooting conditions 1, 2, and 3) are determined for the divided regions (regions 1, 2, and 3), respectively. In the present embodiment, the shooting condition is, for example, a virtual imaging plane position, virtual depth of field, or virtual exposure. Then, as illustrated in FIG. 2C, the shooting conditions (the shooting conditions 1, 2, and 3) determined for the respective divided regions are applied to the respective divided regions to generate reconstructed images. Finally, as illustrated in FIG. 2D, the reconstructed images for the respective divided region are combined (synthesized) into one image, which is outputted as an output image. In this way, the output image of this embodiment is obtained, but in the step of generating the output image from FIG. 2C to FIG. 2D, after the shooting conditions are determined, reconstructed images corresponding to all the shooting conditions may be generated one by one and combined into an output image. Alternatively, in the step of performing the reconstruction process, the output image may be obtained by performing reconstruction processes at one time while using parameters corresponding to the shooting conditions.

Subsequently, a case where the virtual imaging plane position is used as the shooting condition will be described. Specifically, in FIGS. 2A to 2D, the case will be considered where focusing is performed onto regions 2 and 3 at the same time while region 1 is blurred. Then, in the present embodiment, an image reconstructed to be focused on region 2 and an image reconstructed to be focused on region 3 are prepared. For region 1, an image reconstructed to be focused on the image pickup apparatus side (on a front side) relative to region 2 is prepared. These three images are combined into one image. In this configuration, an output image in which both the objects A and B are sharply (clearly) photographed with the background blur remaining (or being furthered) can be obtained.

In the present embodiment, each of the three images need not be an image in which the entire image region is reconstructed. As for regions 2 and 3, an image in which at least the object and the surrounding area are reconstructed may be prepared.

In the case where the virtual depth of field is used as the shooting condition, the same effect can be obtained. In this case, at the stage where the shooting condition of FIG. 2B is determined, the virtual depth of field may be set to increase the depth of field so as to sharply photograph regions 2 and 3. The process subsequent to that is the same as in the case of using the virtual imaging plane position. The same is true of the virtual exposure. In the present embodiment, the process points are illustrated in FIGS. 2A-2D respectively, but where objects are also automatically recognized, these points may be executed internally, and only the final point, FIG. 2D, may be displayed for the user.

In this way, the image processing method of the present embodiment can be performed. The image processing method (an image processing apparatus) of the present embodiment preferably satisfies at least one of the following conditions. Satisfying one or more of these conditions enables further natural blurring. That is, the image processing apparatus preferably includes (A) a reconstructing unit that reconstructs the input image information into a first image (the input image) and outputs it and (B) a boundary determining unit that determines a boundary to divide the first image into at least two regions (the first and second regions). Further, the image processing apparatus preferably includes (C) a shooting condition determining unit that determines different shooting conditions from each other for the first and second regions. Yet further, it preferably includes (D) a boundary processing range determining unit that determines a boundary processing range between the first and second regions. Further, it preferably includes (E) a boundary processing unit that performs boundary processing for the boundary processing range to reduce the difference between the first and second regions, which is generated due to the different shooting conditions from each other.

As to the (D), the boundary processing range determining unit preferably calculates a spread amount of the blur based on the shooting condition for the first or second region. The spread amount of the blur is a spread amount of the blur corresponding to a parallax between before and after a change in an object image, which is calculated based on the shooting condition. Further, the boundary processing range determining unit determines the boundary processing range based on the spread amount of the blur.

As to the (E), the boundary processing unit preferably applies, to the boundary processing range, a shooting condition between the shooting conditions for the regions (the first and second regions) adjacent to each other through the boundary processing range, and performs the boundary processing.

First of all, as to the (A), the reconstructing unit outputs an image (a first image) for the user to confirm first for the shot image. As mentioned above, there is a case where the input image information is not information from which a person can recognize the object. In this case, the user cannot determine what kind of photograph was taken nor whether to be edited from the input image information as it is. Accordingly, in the present embodiment, the reconstructing unit preferably reconstructs and outputs the image (the first image) in view of which to confirm whether to be edited from now in the form of a preview image after the image is shot. Further, the user can use the first image as a reference image in order to determine a boundary, which is the next step. Also where an object is automatically recognized to determine a boundary, if a reference image is necessary, the first image may be used in order to cause an automatically recognizing system to recognize the object.

As to the (B), the boundary determining unit determines a boundary to divide the output image region (an image based on the input image information) into the plurality of regions (the first and second regions). As described below, desired shooting conditions (shooting conditions different from each other) are assigned to the respective regions divided by the boundary determining unit. As to this step, the user himself/herself can also determine the boundary by touch operation on the screen, mouse operation on the PC, or so on. Or the boundary may be automatically determined by face recognition or object recognition (automatic recognition) so as to divide the region.

As to the (C), the reconstructed image generating unit determines (applies) the shooting conditions different from each other for the plurality of regions (the first and second regions). As described above, the shooting condition is the virtual imaging plane position, virtual depth of field, virtual exposure, or the like. The shooting conditions can be determined arbitrarily by the user each time. Alternatively, the image pickup apparatus may have a plurality of tables as presets corresponding to object shapes to automatically determine the shooting conditions according to the scene.

As to the (D), the boundary processing range determining unit determines the boundary processing range, and then performs preparation for the boundary processing by the boundary processing unit. For example, suppose that an image having a plurality of virtual imaging plane positions is generated within one output image region. Here, for simplicity, it is assumed that a scene including two objects (objects A and B) where the distances from the image pickup apparatus (not shown) to the two objects are different from each other as illustrated in FIG. 3. The object A is an object close to the image pickup apparatus, and the object B is an object far from the image pickup apparatus. Further, it is assumed that these two objects are planar objects having no depth and that some background exists behind the objects A and B. The desired image is an image in which both the objects A and B are in focus, and as to the extent of the background blur, a background blur with the object A being in focus is preferable.

In an image in which the object A is in focus, the object B is out of focus (blurred). If a sharply photographed image of the object B is applied onto the object B in the image in which the object A is in focus, the area into which the original object B is blurred and spread remains, so that the image may become somewhat unnatural. In this case, it is preferable to remove the area into which the object is blurred and spread, but the spread amount of the blur cannot be recognized unless information about the distances to the objects is known.

In contrast, according to the image pickup apparatus (the light field camera) of the present embodiment, the spread amount of the blur can be calculated because the information about the distances is obtained. For example, by undergoing the steps as illustrated in FIG. 4, the boundary processing range can be determined considering the spread amount of the blur. The "boundary processing range" in the present embodiment is a range of a spread amount $\Delta x_p$ pixels of the blur of the object from a boundary defined by the object not blurred at the beginning in a reconstructed image. The "boundary processing range" may be a range of at least $\Delta x_p$ pixels, but may be determined as a region of $\Delta x_p + \alpha$ pixels with $\alpha$ as a margin depending on the object or scene. The user can determine a magnitude of the margin $\alpha$ each time. The image pickup apparatus may previously have the information as presets according to the object shapes.

FIG. 4 is a diagram of describing a method of determining the boundary processing range. In step S001, the boundary processing range determining unit obtains, as the first image, for example, an image in which the object A at the front side is in focus. Then, in step S002, the boundary processing range determining unit determines the boundary of the object B. At this time, the boundary processing range determining unit can reconstruct, for example, an image with a deeper depth of field in which both the objects A and B are sharply photographed to determine the boundary processing range. Alternatively, it may determine the boundary based on the outline of the object B using a distance map (a depth map) in which the distance information is used or may determine the boundary of the object B by refocusing on the object B. The refocusing is a process of focusing onto any object anew by the reconstruction process after the image is shot. Because the refocusing is described in detail in the literature of Ren Ng, "Fourier Slice Photography", 2005 ACM Trans. Graph. 24, 735-744, description thereof is omitted herein.

Subsequently, in step S003, the boundary processing range determining unit calculates the spread amount $\Delta x_p$ of the blur of the object B when the virtual imaging plane position is moved from the virtual imaging plane position at which the object B is in focus to the virtual imaging plane position at which the object A is in focus. Then, in step S004, the boundary processing range is determined based on the spread amount $\Delta x_p$ of the blur calculated in step S003. The boundary processing range preferably has a width greater than or equal to the spread amount $\Delta x_p$ of the blur ($\Delta x_p$ pixels).

Figure 5A:
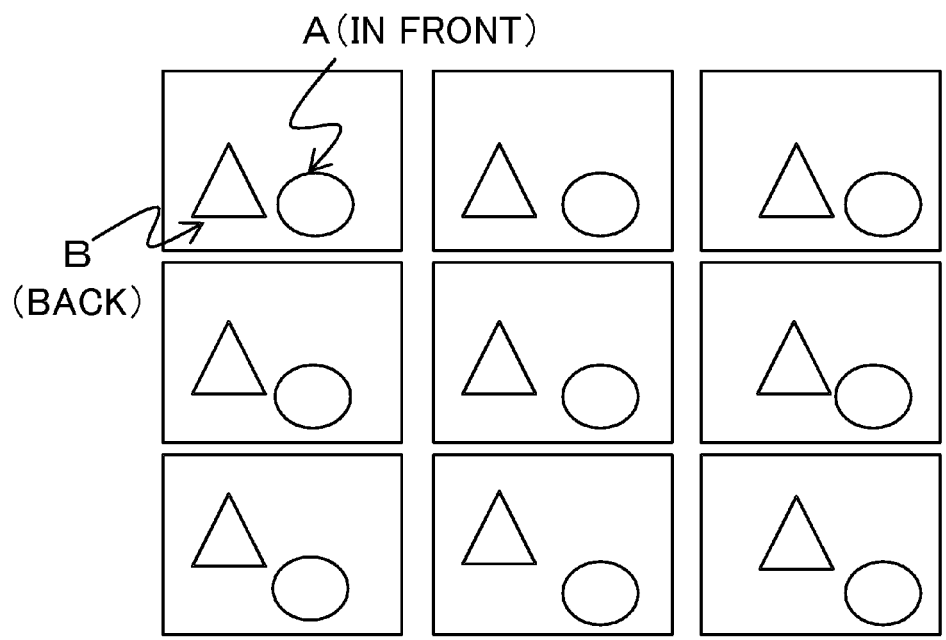
FIGS. 5A and 5B are diagrams of describing a refocus process in each of the embodiments.
Figure 5B:
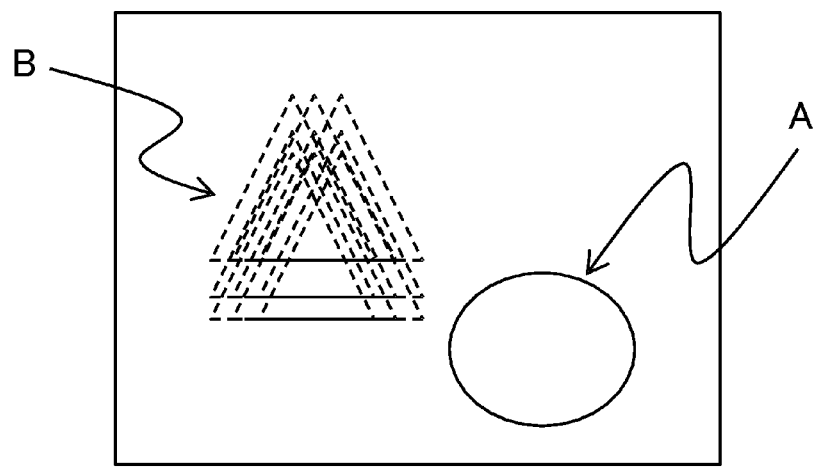

Next, referring to FIGS. 5A and 5B, a method of calculating the spread amount $\Delta x_p$ of the blur will be described. FIGS. 5A and 5B are diagrams of describing a method (a refocus process) of focusing onto an arbitrary position using a plurality of viewpoint images. FIG. 5A illustrates images taken from the plurality of viewpoints (the plurality of viewpoint images, nine viewpoints image in the present embodiment). When an image in which the object A further forward is in focus is generated from these images, the reconstruction process needs to be performed on all the nine images such that the objects A in them coincide (are overlapped) with each other. Any of the nine images can be an image as a reference to be overlapped with each other, and if the reconstruction is performed, for example, with the center image of the nine images as the reference, the image (the reconstructed image) illustrated in FIG. 5B is generated.

In FIG. 5B, the nine images are reconstructed such that the objects A coincide (are overlapped) with each other, and hence the object A is in focus. On the other hand, all the nine images have parallaxes between them, and hence the objects B further backward than the objects A are offset (shifted) by their parallaxes. These offsets appear as blurs. Thus, in the present embodiment, calculating the spread amount of the blur ($\Delta x_p$ pixels) is equivalent to calculating a parallax amount. If the greatest parallax amount among the parallax amounts that the object can take on when an object is photographed with an image pickup apparatus is known, the greatest value of the spread amount of the blur can be realized. The greatest parallax amount of an object is determined by the distance to the object to be photographed and the exit pupil diameter of the image pickup apparatus. As such, in order to calculate the spread amount of the blur when the plurality of viewpoint images are reconstructed into one image, the distance to the object to be photographed and the exit pupil diameter of the image pickup apparatus need only be realized. This is the same as the method of calculating geometrically the spread amount of the blur using a conventional camera.

Figure 6:
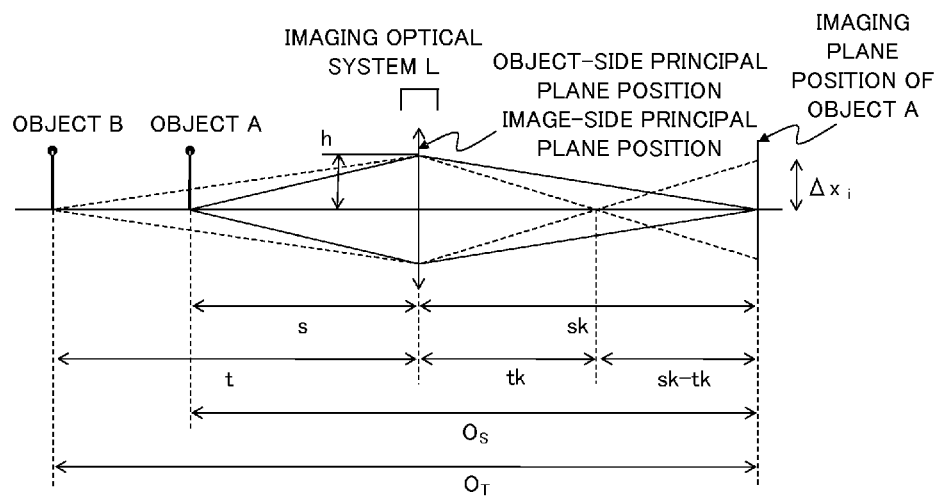
FIG. 6 is a diagram of describing a method of calculating a blur spread amount $\Delta x_i$.

Thus, referring to FIG. 6, the method of calculating the spread amount of the blur using a conventional camera will be described. FIG. 6 is a diagram of describing a way to find the spread amount $\Delta x_i$ of the blur. FIG. 6 illustrates a model for an imaging optical system L having a focal length f and an exit pupil radius h. For simplicity, suppose that the object-side principal plane position and the image-side principal plane position of the imaging optical system L are the same. Symbol s is a distance from the object-side principal plane position of the imaging optical system L to the object A and symbol t is a distance to the object B. Symbol sk is a distance from the image-side principal plane position of the imaging optical system L to the imaging plane of the object A, and symbol tk is a distance from the image-side principal plane position of the imaging optical system L to the imaging plane of the object B. The object A and the imaging plane position of the object A are in a conjugate relation. In FIG. 6, an optical path diagram when the object A is in focus is drawn by solid lines, and rays from the object B at that time are drawn by dotted lines. In this case, the following Expressions (1) and (2) are satisfied.

$$1/s + 1/sk = 1/f \quad (1)$$

$$1/t + 1/tk = 1/f \quad (2)$$

As seen from FIG. 6, $O_S = s + sk$, and $O_T = t + sk$ are satisfied. Assuming that the distances $O_S$ and $O_T$ of the objects A and B are known, the spread amount $\Delta x_i$ of the blur on the imaging plane is represented by the following Expression (3).

$$\Delta x_i = (sk - tk) \times h/tk \quad (3)$$
$$= (O_s - s) \times h \times \{1/f - 1/(O_T - O_S + s)\} - h$$

In this way, the spread amount $\Delta x_i$ of the blur on the imaging plane of the imaging optical system L can be calculated. Thus, in a conventional camera, when $s_p$ denotes a pixel pitch on the imaging plane of the image pickup element, the spread amount $\Delta x_p$ of the blur in the output image is expressed as the number of pixels of the output image converted from the spread amount of the blur on the imaging plane, as represented by the following Expression (4).

$$\Delta x_p = \Delta x_i / s_p \quad (4)$$

Up to this, the camera (the light field camera) of the present embodiment is the same as the conventional camera as mentioned above. However, the camera of the present embodiment differs from the conventional camera in that the input image information is reconstructed to generate an output image. Hence, in the present embodiment, simply using Expression (4) may not be able to convert it into the spread amount of the blur (pixels) on the reconstructed output image depending on the configuration of the image pickup apparatus. Accordingly, in the present embodiment, a coefficient Q for converting the spread amount of the blur geometrically calculated as above into the number of pixels on the output image needs to be considered. The coefficient Q takes on various values depending on the configuration of the image pickup apparatus. The conversion equation used in the present embodiment is represented by the following Expression (5).

$$\Delta x_p = Q \times \Delta x_i / s_p \quad (5)$$

The value of the coefficient Q will be described in detail in the embodiment for each image pickup apparatus described below.

As such, even when the refocus is performed onto an arbitrary position, the blur amount of another object on the reconstructed image can be calculated. The method of calculating the spread amount $\Delta x_i$ of the blur is not limited to this, but another method may be used to calculate it.

Figure 7:
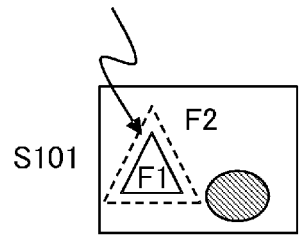
FIG. 7 is diagram of describing boundary processing in each of the present embodiment.
Figure 7:
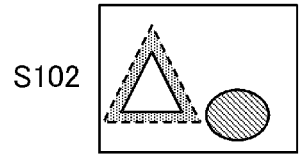
Figure 7:
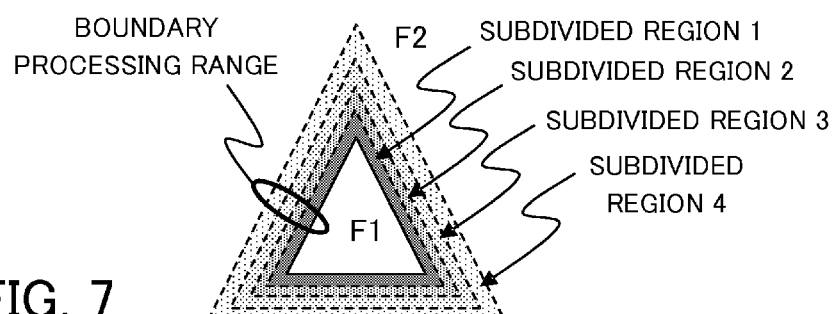

Next, the (E) will be described with reference to FIG. 7. FIG. 7 is a diagram of describing the boundary processing in the present embodiment. Here, in an image in which the object A is in focus, an image in which the object B is in focus is reconstructed within a determined boundary. The purpose of the boundary processing is to prevent the occurrence of unnaturalness such as an edge standing out at the boundary of the object B, so that it looks more natural.

First, in step S101, the virtual imaging plane positions at regions F1 and F2 (the first and second regions) adjacent to each other through the boundary processing range are compared. Then, it is determined whether the boundary processing range needs to be further subdivided. If in step S101 the boundary processing range is further subdivided, a more natural image can be generated, which is preferable. The user can arbitrarily determine the necessity of subdividing. Alternatively, it may be automatically determined from the separation amount between the virtual imaging plane positions of the regions F1 and F2 with use of a threshold.

Subsequently, in step S102, an image of a virtual imaging plane position between those of the regions F1 and F2 is reconstructed and combined to be fit in the boundary processing range. As a result, a gradational link between the regions F1 and F2 can be achieved, so that a natural image can be generated, which is preferable. The "virtual imaging plane position between those of the regions F1 and F2" does not need to be the center (in a strict sense) virtual imaging plane position between the virtual imaging plane positions of the regions F1 and F2, but may be slightly offset (shifted) toward the virtual imaging plane position of the region F1 or F2.

If in step S101 it is determined that subdividing is not necessary, an image of a virtual imaging plane position between those of the regions F1 and F2 need only be reconstructed and fit in the entire range being boundary processed as described above. On the other hand, if it is determined that subdividing is necessary, an equal number of images (subdivided regions 1 to 4), to the number of subdivisions, of which the virtual imaging plane position gradually changes when going from the region F1 to the region F2, need only be reconstructed. This means prevents the occurrence of unnaturalness such as an edge standing out at the boundary of the object B, so that the image looks more natural. Although in the present embodiment the case of the virtual imaging plane position is described, the same applies to the case of the virtual depth of field or the virtual exposure.

Next, referring to FIGS. 8A and 8B, the case where the virtual depth of field is set as the shooting condition will be described. FIGS. 8A and 8B are diagrams of describing a method of determining the boundary processing range. FIG. 8A illustrates an example where an object C having a depth such as a toy robot against a certain background is photographed. A scene where photography is performed with the right eye of the object C being in focus and the background being in a blur by an image pickup apparatus having a shallow depth of field will be taken as an example. Here, the image pickup apparatus having a shallow depth of field is one having a small combined F-number for the case of a camera array and one having a small F-number of the imaging optical system for the case of ones having a lens array between the imaging optical system and the sensor.

If photography is performed by a conventional camera, the background is nicely blurred as illustrated in FIG. 8B, but the entire object C may be not sharply photographed because of its shallow depth of field, resulting in the back side of the body and the like being in a blur. This may happen in the case of using a bright lens having, e.g., a focal length of 50 mm and an F-number of 1.4 or a super-telephoto lens.

In contrast, the light field camera of the present embodiment can calculate the spread amount $\Delta x_p$ of the blur because distance information is obtained as well. The method of the calculation is the same as described above, but because the light beam diameter to be used is different according to the specified virtual depth of field, the value of the exit pupil radius h is different. With the virtual depth of field corresponding to the aperture stop being open, the value of the exit pupil radius h is not different from the above mentioned value, and when the virtual depth of field is increased (virtual F-number is increased), the value of the exit pupil radius h may be reduced correspondingly in calculation.

Referring to FIG. 9, a method of calculating the spread amount $\Delta x_i$ of the blur will be described. FIG. 9 is a diagram of describing the method of calculating the spread amount $\Delta x_i$ of the blur, which illustrates a simple model as an example. In FIG. 9, the right eye position of the object C and the imaging plane position when the right eye of the object C is in focus are in a conjugate relation. Symbol h is the exit pupil radius, which determines the light beam. In the present embodiment, the background is nicely blurred, but the back part of the body of the object C is also blurred because of the shallow depth of field. At this time, the spread amount of the blur on the imaging plane position is denoted by $\Delta x_i$. When the magnitude of the spread amount $\Delta x_i$ of the blur is smaller than or equal to half of the pixel pitch, conventional cameras cannot determine the spread amount of the blur on the image pickup element, thus obtaining a sharp image. The light beam determined by the exit pupil radius h' which is indicated by a dot-dashed line represents that case, and $\Delta x_i'$ is the spread amount of the blur for that case. If the pixel pitch of the image pickup apparatus is known, the value of h' at the spread amount $\Delta x_i'$ of the blur can be obtained, and hence it can also be calculated what value the F-number is at so that the entire object C is sharply photographed. Also in the present embodiment, it can be calculated in a similar way what value the virtual depth of field (virtual F-number) is at so that the entire object C is sharply photographed, but the conversion equation as represented by Expression (5) is needed as described above.

Figure 10:
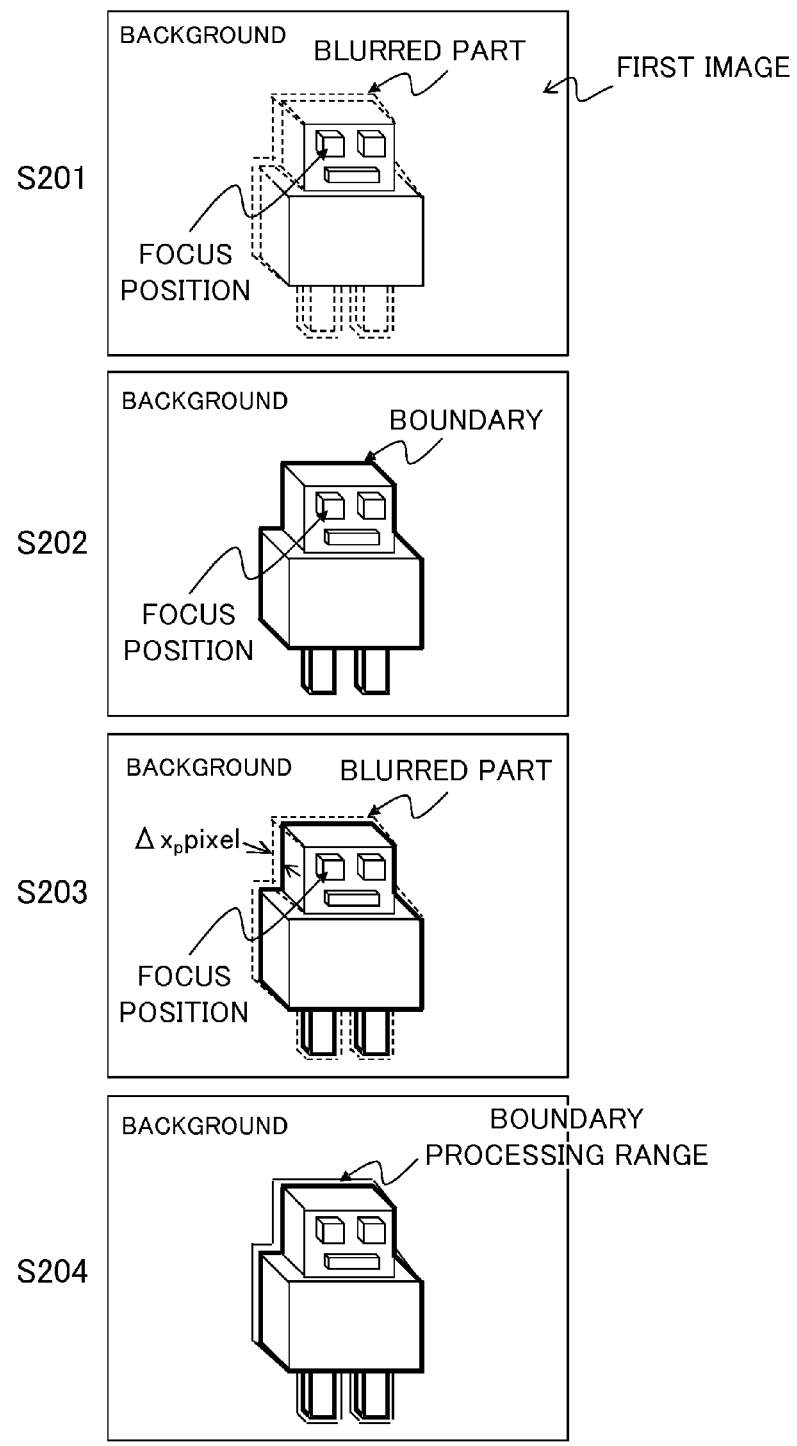
FIG. 10 is a diagram of describing a method of determining a boundary processing range in each of the embodiments.

Next, referring to FIG. 10, a method of determining the boundary processing range will be described. FIG. 10 is a diagram of describing the method of determining the boundary processing range. By undergoing each of the steps of FIG. 10, the boundary between the regions can be determined with considering the spread amount of the blur. Also in this example, as in the case of the virtual imaging plane position described above, the range of the spread amount of the blur ($\Delta x_p$ pixels) of the object is referred to as a "boundary processing range". Alternatively, depending on the object or scene, $\Delta x_p + \alpha$ pixels, with $\alpha$ as a margin, may be referred to as a "boundary processing range".

First, in step S201 of FIG. 10, for example, an image of a shallow depth of field in which the right eye of the object C is in focus is obtained as a first image. At this time, the background blur is good in the blur amount, but the back part of the body of the object C is blurred because of the shallow depth of field. Then, in step S202, the boundary of the object C is determined. This is because if an attempt to set the outline of the object C as the boundary using the first image is made, it is difficult to realize the outline because a blurred part exists in the image in this state. For example, an image of a large virtual depth of field in which the entire object C is sharply photographed can be reconstructed to be used in determining the boundary. Alternatively, the boundary may be determined from the outline of the object C using a distance map (depth map) in which the distance information is used.

Subsequently, in step S203, the spread amount $\Delta x_p$ of the blur of the object C when switching to a virtual depth of field with which a desired background blur is obtained is calculated from an image of a large virtual depth of field in which the entire object C is sharply photographed. Here, the image of the large virtual depth of field is, for example, the first image obtained in step S202.

Subsequently, in step S204, the boundary processing range is determined based on the spread amount $\Delta x_p$ of the blur calculated in step S203. The boundary processing range preferably has a width greater than or equal to $\Delta x_p$ pixels. The boundary processing range may be automatically determined to be at $\Delta x_p$ pixels or at $\Delta x_p + \alpha$ pixels with $\alpha$ as a margin depending on the object. The user can determine the margin $\alpha$ each time. Or the image pickup apparatus may previously have them as presets according to object shapes. Since the object C has a depth, the value of $\Delta x_p$ is different for each point on the boundary. Hence, strictly speaking, the value of $\Delta x_p$ is preferably obtained for each pixel, but the values of $\Delta x_p$ may be calculated for pixels apart with others in between to interpolate from depending on the size of the object C.

As such, the blur amount of part of the object having a depth on the image after reconstruction can be calculated when the depth of field is shallow. Thus, the boundary processing range can be determined. The method of calculating the spread amount $\Delta x_i$ of the blur is not limited to this, but another method may be also used.

Figure 11:
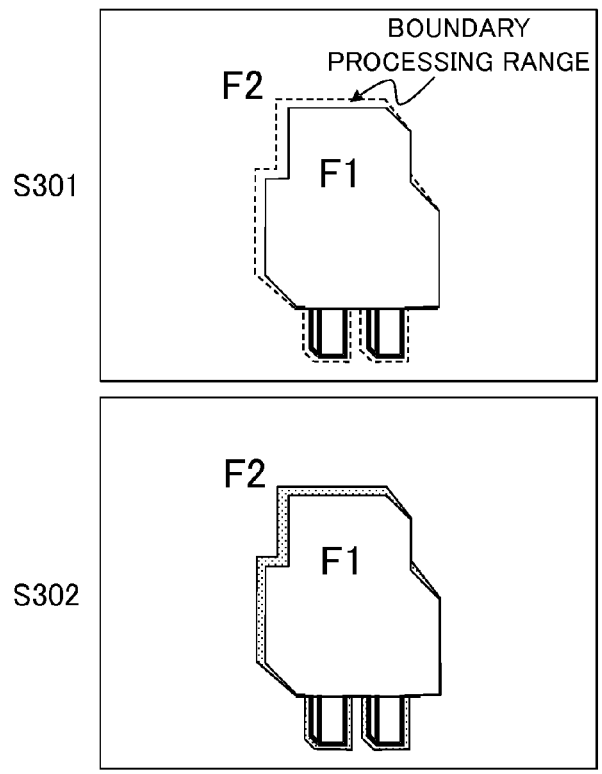
FIG. 11 is a diagram of describing boundary processing in each of the embodiments.
Figure 12:
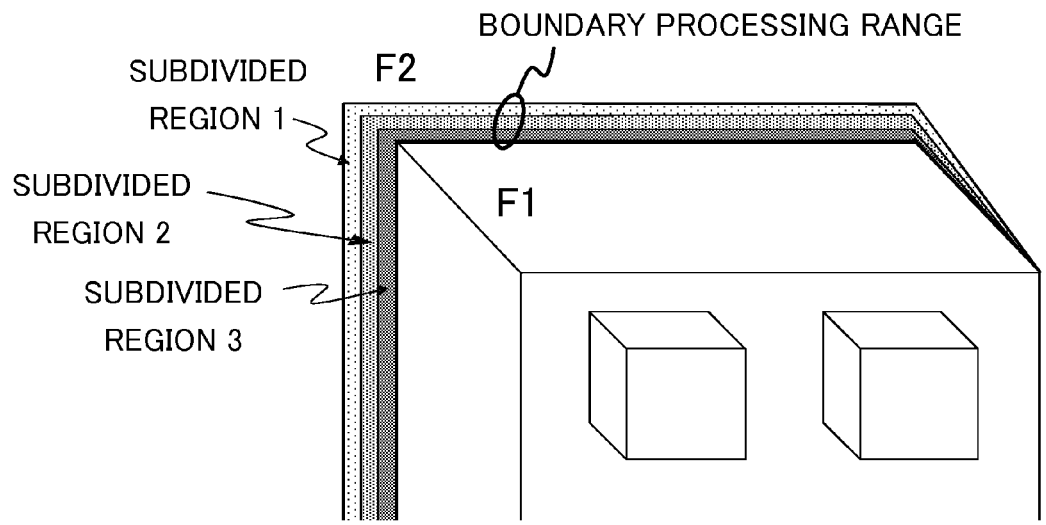
FIG. 12 is a diagram of describing boundary processing in each of the embodiments.

Next, referring to FIGS. 11 and 12, the boundary processing in the present embodiment will be described in detail. FIGS. 11 and 12 are diagrams of describing the boundary processing in the present embodiment.

First, in step S301 in FIG. 11, the virtual depths of field at the regions F1 and F2 adjacent to each other through the boundary processing range are compared, and it is determined whether the range where the boundary process is to be performed needs to be further subdivided. If in step S301 the boundary processing range is further subdivided, a more natural image can be generated, which is preferable. The user can arbitrarily determine the necessity of subdividing. Alternatively, it may be automatically determined from the separation amount between the virtual depths of field of the regions F1 and F2 with use of a threshold.

Subsequently, in step S302, an image of a virtual depth of field between those of the regions F1 and F2 is reconstructed and combined to be fit in the boundary processing range. As a result, a gradational link between the regions F1 and F2 can be achieved, so that a natural image can be generated, which is preferable. The "virtual depth of field between those of the regions F1 and F2" does not need to be the center (in a strict sense) virtual depth of field between the virtual depths of field of the regions F1 and F2, but may be slightly offset (shifted) toward the virtual depth of field of the region F1 or F2.

If in step 301 it is determined that subdividing is not necessary, an image of a virtual depth of field between those of the regions F1 and F2 need only be reconstructed and fit in the entire boundary processing range as described above. On the other hand, if it is determined that subdividing is necessary, an equal number of images (subdivided regions 1 to 3), to the number of subdivisions, of which the virtual depth of field gradually changes when going from the region F1 to the region F2, need only be reconstructed and combined. This means prevents the occurrence of unnaturalness such as an edge standing out at the boundary of the object C, so that the image looking more natural can be generated, which is preferable.

Since images different in the virtual depth of field are reconstructed into one image, if they are combined as they are into a final output image, then an image in which regions different in the virtual depth of field are different in brightness may be outputted. This can be understood when the case is considered where the stop value is different for each region with the shutter speed being the same. At this time, an edge of each region may stand out and look floating, which is not preferable. In order to prevent this, luminance signal values multiplied by weighting coefficients that differ by differences in brightness (luminance level differences) due to differences between the virtual depths of field of the regions, may be combined into an output image.

Next, a case where the virtual exposure is used as the shooting condition will be described. In this case, the focus position and the depth of field are arbitrary, and the virtual exposures (brightness of images) for the regions determined are changed using the method of weighting luminance values in reconstructing the input image information, and their images are combined into an output image.

As described above, the method of reconstructing one image from the input image information is described with reference to FIGS. 5A and 5B. When nine parallax images as illustrated in FIGS. 5A and 5B are reconstructed into one image, the reconstructed image is a whitish blown-up image in which luminance saturation occurs if luminance values of the nine images are simply added together. Hence, when the nine parallax images are reconstructed simply without weighting each of them, not only luminance values of the nine images are added together, but also the luminance values need to be divided by the number of parallax images used in reconstruction. As a result, a reconstructed image in which the same brightness as that of one parallax image is maintained is obtained. At this time, brightness in the regions can be changed by weighting luminance values of the used parallax images not evenly for each parallax image but with different weighting coefficients.

While duplicate description of the same things as above is omitted, the case of the virtual exposure differs from the case of the virtual imaging plane position or virtual depth of field in the step of calculating the spread amount of the blur. In the case of the virtual imaging plane position or virtual depth of field, because the subject is the blur amount, the spread amount of the blur is calculated. On the other hand, in the case of the virtual exposure, not the spread amount of the blur but the exuding amount of light is calculated. Light exuding means that when a light source is photographed whitish blown up (luminance saturated), not only the light source but also its vicinity is saturated in luminance according to the intensity of light of the light source or, if not saturated, photographed bright. The step of calculating the exuding amount of light to determine the boundary processing range is different than in the case of the virtual imaging plane position or virtual depth of field.

In the case of the virtual imaging plane position or virtual depth of field, when a sharply shot image of an object is reconstructed on a blurred image of the same object, the spread of the blur of the blurred original object image remains, and thus the boundary processing is performed to eliminate this. On the other hand, a scene supposed for light exuding is one where, if reconstructed as usual, the luminance value of the light source becomes saturated with the vicinity of the light source being also saturated in luminance (or photographed bright). For this scene, a dark image of the area of the light source part in which the luminance value of the light source is not saturated may be reconstructed in order to simply remove the luminance saturation of the light source.

However, even if the region is divided into the light source part and the other part and reconstruction is performed with a different weighting coefficient for only the light source area part so as to make the image dark, light exuding remains in the other part than the light source, which is not preferable. If the exuding amount of light is known, taking that part as the "boundary processing range", reconstruction may be performed for the range using a different weighting coefficient to be darker such that the light exuding comes to not stand out. However, if the area where light has exuded in a parallax image before the reconstruction is already saturated in luminance, the area where light has exuded cannot be removed because there is no information. In this case, the parallax image set darker than normal needs to be obtained so that luminance saturation does not occur in the area where light has exuded to be removed. Then, in performing the reconstruction, the parallax image is preferably weighted to be brighter and reconstructed, thereby generating an output image with appropriate brightness.

Figure 25:
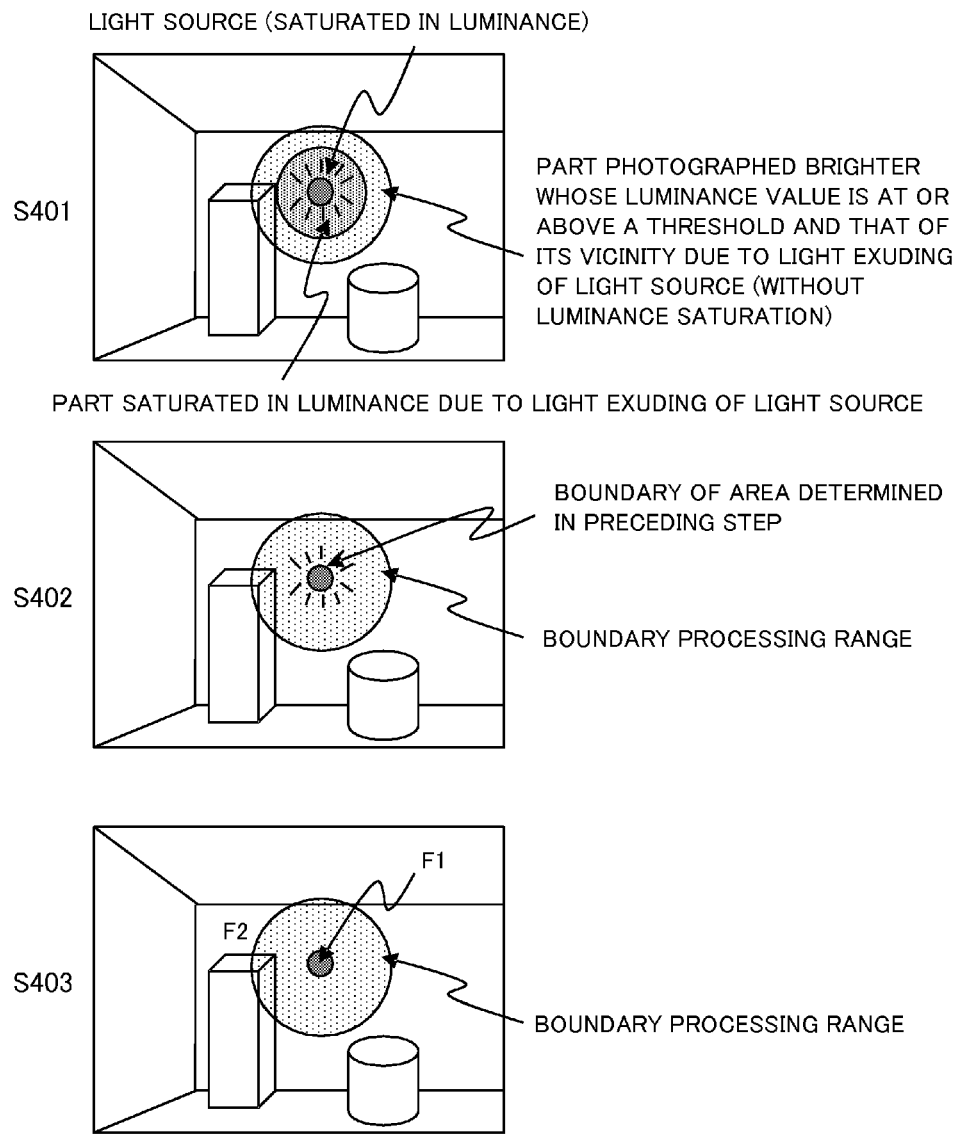
FIG. 25 is a diagram of describing a method of calculating an exuding amount of light in each of the embodiments.

Next, referring to FIG. 25, a method of calculating the exuding amount of light in the present embodiment will be described. FIG. 25 is a diagram of describing the method of calculating the exuding amount of light. It is the premise that, as described above, parallax images set darker than normal are obtained so that luminance saturation does not occur in the area where light has exuded to be removed, and the following process may be performed on the parallax images.

First, in step S401, weighting for being brighter is performed so as to achieve normal, appropriate brightness at reconstruction, and reconstruction is performed on the entire image. Subsequently, in step S402, the vicinity part of the light source area which is saturated in luminance or whose luminance value is at or above a predetermined threshold is determined to be a boundary processing range. Then, in step S403, the boundary processing is performed for the determined boundary processing range. Because the contents of step S403 and later of the boundary processing (the determination of whether to subdivide the boundary processing range and the later process) are the same as in the above case of the virtual imaging plane position or virtual depth of field, description thereof is omitted. A user can arbitrarily determine the predetermined threshold. Alternatively, the image pickup apparatus may have a table of thresholds for the supposed scenes.

According to the image processing method (the image processing program) in the present embodiment, an output image having a plurality of different shooting conditions within one image is obtained. Although the present embodiment describes the case where the virtual imaging plane position, virtual depth of field, or virtual exposure is controlled independently of each other to change the shooting condition for easiness of understanding, the present embodiment is not limited to this. In the present embodiment, there may be a plurality of virtual imaging plane positions, virtual depths of field, and virtual exposures in combination, mixed in one output image region. In the present embodiment, the shooting condition is not limited to the virtual imaging plane position, virtual depth of field, or virtual exposure.

An image pickup apparatus (an image processing apparatus) which executes an image processing method (an image processing program) in the present embodiment will be described in each embodiment below.

Embodiment 1

Figure 18:
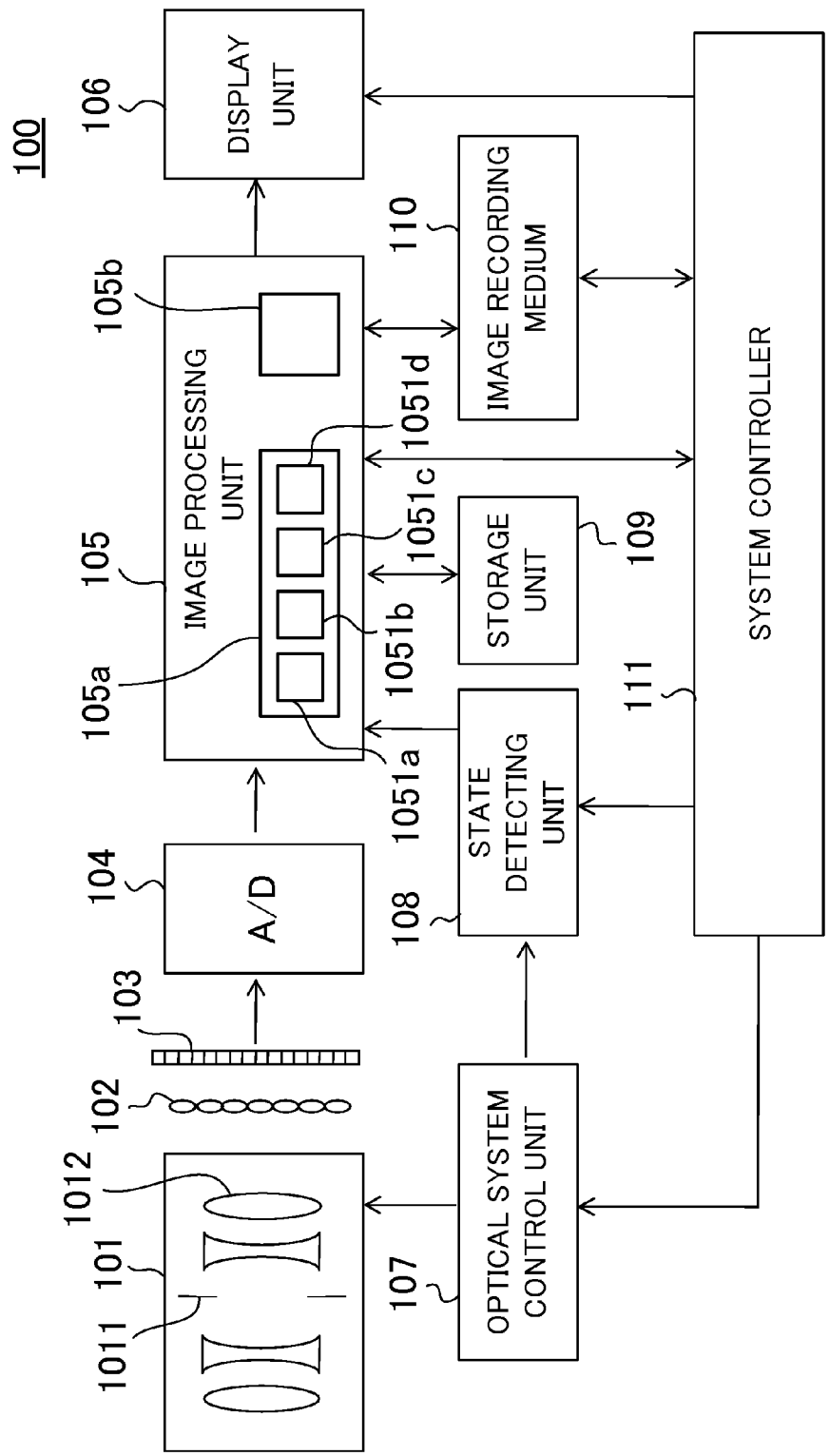
FIG. 18 is a block diagram of an image pickup apparatus in each of Embodiments 1 to 3 and 5.

Next, referring to FIG. 18, a configuration of an image pickup apparatus (an image pickup optical system) in Embodiment 1 of the present invention will be described. FIG. 18 is a block diagram of an image pickup apparatus 100 in the present embodiment. The image pickup apparatus 100 can generate an output image (a reconstructed image) from an input image (a shot image) by executing the image processing method of the present embodiment.

As illustrated in FIG. 18, the image pickup apparatus 100 includes a lens array 102 between an imaging optical system 101 (an image pickup optical system) and an image pickup element 103 and can simultaneously obtain images from a plurality of viewpoints. In the image pickup apparatus 100, an object (not shown) is imaged on the image pickup element 103 via the imaging optical system 101 including an aperture stop 1011 and a focus lens 1012, and the lens array 102.

The image pickup element 103 is a two-dimensional image pickup element such as a CCD (Charge Coupled Device) or a CMOS (Complementary Metal-Oxide Semiconductor). The energy of a ray incident on the image pickup element 103 via the imaging optical system 101 and the lens array 102 changes into an electric signal (an analog signal). As such, the image pickup element 103 photoelectrically converts an object image formed via the imaging optical system 101 and the lens array 102 to obtain the shot image. The shot image (imaged light) obtained by the image pickup element 103 is converted into an electric signal and outputted to an A/D converter 104. The A/D converter 104 converts the electric signal (the analog signal) inputted from the image pickup element 103 into a digital signal, which is outputted to an image processing unit 105.

The image processing unit 105 performs a reconstruction process of an image along with a predetermined process. The image processing unit 105 obtains a shooting condition (shooting condition information) for the image pickup apparatus 100 from a state detecting unit 108. The shooting condition information includes the configuration of the image pickup optical system (the imaging optical system), an object distance, a stop value, a focal length in a zoom lens, or the like. The state detecting unit 108 can obtain the shooting condition information directly from a system controller 111, or can obtain shooting condition information of the imaging optical system 101 (the image pickup optical system) from an optical system control unit 107.

The image processed in the image processing unit 105 is stored in an image recording medium 110 such as a semiconductor memory in a predetermined format. The image obtained by performing a predetermined process for display on the image after the image processing in the present embodiment is displayed on a display unit 106. Or for quick display, the image obtained by performing a simplified process may be displayed. When the image stored in the image recording medium 110 is displayed on a display unit 106, the image processing unit 105 performs the reconstruction process based on the shooting condition information. At this time, the image processing unit 105 performs a noise reducing process as well. As a result, the image (the reconstructed image) reconstructed to be a desired viewpoint, a focus position, and depth of field is displayed on the display unit 106. Further, for high speed processing, a desired setting (the viewpoint, focus position, depth of field, etc., of the image) is previously stored in a storage unit 109, and the reconstructed image can be displayed directly on the display unit 106, not via the image recording medium 110. The image stored in the image recording medium 110 may be a reconstructed image.

A series of controls in the image pickup apparatus 100 is performed by the system controller 111. The mechanical drive of the imaging optical system 101 is performed by the optical system control unit 107 according to the instruction of the system controller 111. The aperture diameter of the aperture stop 1011 is controlled for a shooting state setting of the stop value (F-number). The position of the focus lens 1012 is controlled by an autofocus (AF) mechanism or a manual focus mechanism (neither shown) to perform focusing according to the object distance.

Although in the present embodiment the imaging optical system 101 (a lens apparatus) is configured to be integral with the image pickup apparatus (an image pickup apparatus body), the present embodiment is not limited to this. The imaging optical system 101 may be an interchangeable lens configured to be removably attached to the image pickup apparatus body such as a single-lens reflex camera.

Figure 13:
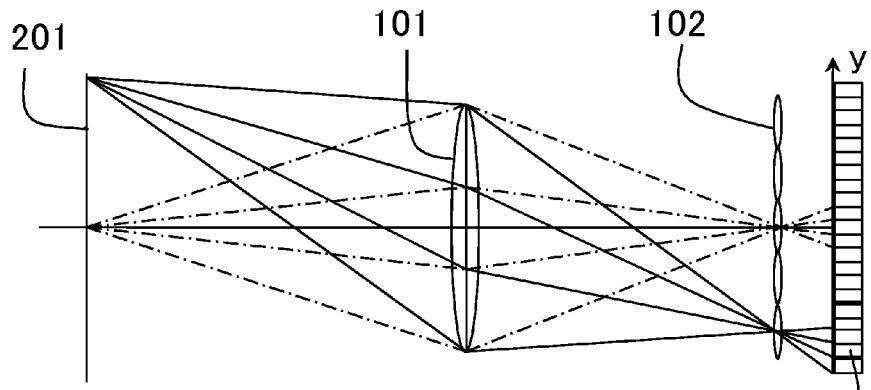
FIG. 13 is a schematic configuration diagram of an image pickup optical system in Embodiment 1.

Next, referring to FIG. 13, the configuration of the image pickup optical system in the present embodiment will be described. FIG. 13 is a schematic configuration diagram of the image pickup optical system. The image pickup optical system includes the imaging optical system 101, the lens array 102, and the image pickup element 103. In the present embodiment, the lens array 102 is constituted by a plurality of lenses (small lenses), and the small lens is constituted by a solid lens. The present embodiment is not limited to this, but the lens array 102 may also be constituted by liquid lenses, liquid crystal lenses, or diffraction optical elements. The lens array 102 may also be constituted by a plurality of lenses. The small lens constituting the lens array 102 has surfaces on both sides each of which has a convex shape. The present embodiment is not limited to this, but the surface on one side may be a plane, and the surface on the other side may have a convex shape.

The lens array 102 is disposed at the image-side conjugate plane of the imaging optical system 101 with respect to the object plane 201. Further, the lens array 102 is configured such that the exit pupil of the imaging optical system 101 and the image pickup element 103 are in a substantially conjugate relation. Rays from the same position on the object plane 201 pass through the imaging optical system 101 and the lens array 102, and then are incident on different pixels of the image pickup element 103 according to their position and angle on the object plane 201, and thus a light field is obtained. Here, the lens array 102 functions to prevent rays passing through different positions on the object plane 201 from being incident on the same pixel. As a result, in the image pickup element 103, an image in which a pixel group is arranged by photographing the same area on the object plane 201 from the plurality of viewpoints is obtained. In the configuration illustrated in FIG. 13, images of the same position on the object plane 201 are shot by using three pixels (nine pixels in two dimensions). Hence, as to the image pickup optical system of the present embodiment, its two-dimensional spatial resolution is reduced to ⅑ of that of an image pickup optical system which obtains only the two-dimensional intensity distribution of light. This remains the same qualitatively even if the number of pixels to shoot images of the same position on the object plane 201 changes.

Subsequently, the refocus process in the present embodiment will be described. Because the refocus process is described in detail in the literature of Ren Ng, "Fourier Slice Photography", 2005 ACM Trans. Graph. 24, 735-744, here a brief description will be made.

Figure 19A:
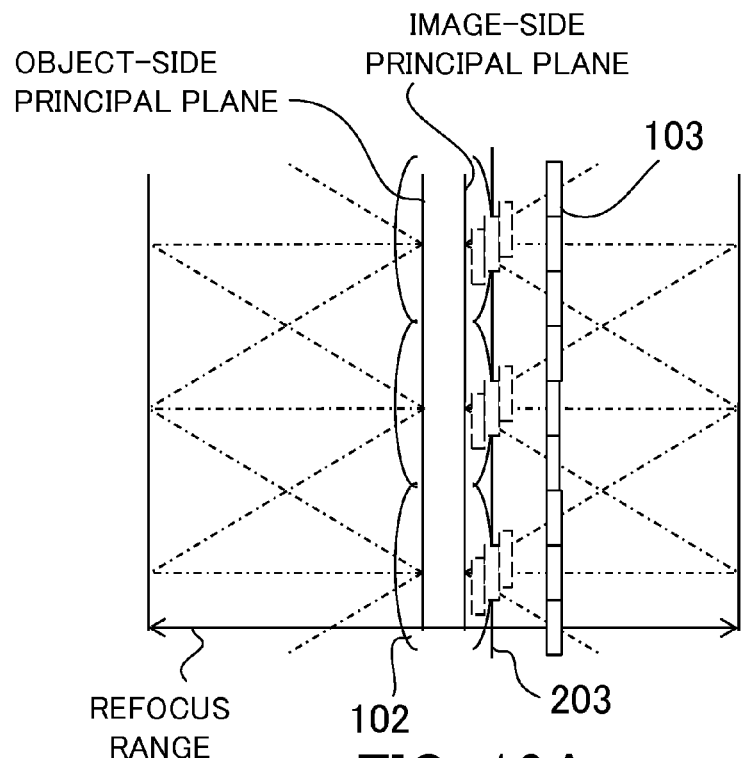
FIGS. 19A and 19B are diagrams of describing generation of a refocus image in Embodiment 1.
Figure 19B:
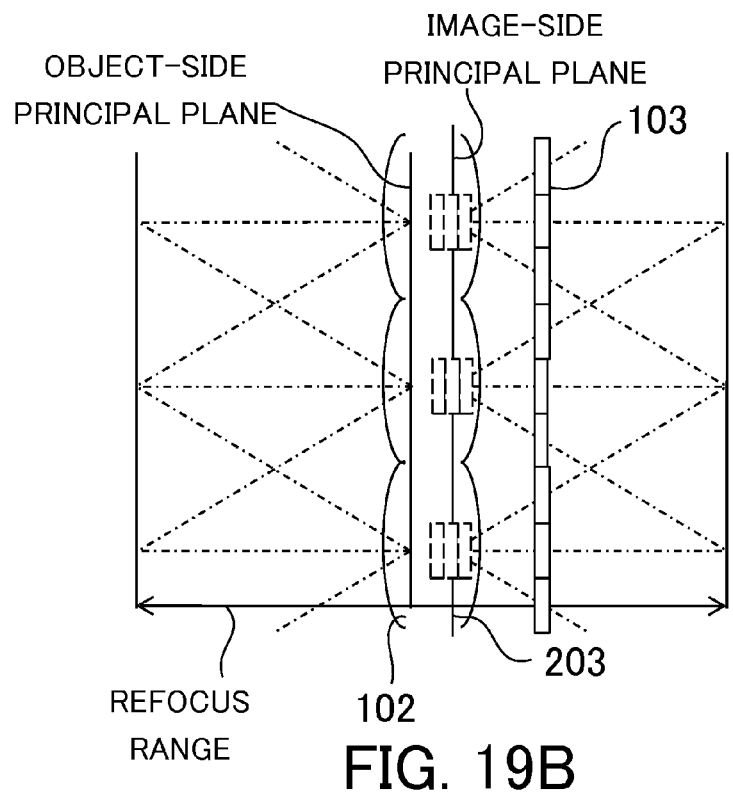

Next, referring to FIGS. 19A and 19B, an example of the method of generating a refocused image will be described. FIGS. 19A and 19B are detailed diagrams of the lens array 102 and the image pickup element 103 in the image pickup optical system illustrated in FIG. 13. The path, and its extension, of a ray passing through the center of each pixel and the image-side principal point of a small lens corresponding to this pixel are indicated by a dot-dashed line in FIGS. 19A and 19B. The virtual imaging plane 203 indicates the image-side conjugate plane of the imaging optical system 101 with respect to a plane at the object side onto which focusing is to be performed by refocus. In the present embodiment, when the image-side conjugate plane is located on the image side relative to the object-side principal plane of the lens array 102, the plane obtained by moving the image-side conjugate plane by the principal plane interval of the lens array 102 toward the image side is the virtual imaging plane 203. By translating pixel values obtained by the image pickup element 103 along the dot-dashed line to the virtual imaging plane 203 to combine them, a refocused image at a desired focus position can be generated.

For example, in order to generate an image in which the object plane 201 in FIG. 13 is in focus, the virtual imaging plane 203 may be set to be at the plane conjugate with the object plane 201 via the imaging optical system 101, that is, the principal plane (the image-side principal plane) of the lens array 102 as illustrated in FIG. 19B. In FIGS. 19A and 19B, pixels translated in generating a refocused image are indicated by broken lines and depicted such that they are offset (shifted) from each other, which are not overlapped with each other, for easiness of understanding. As illustrated in FIGS. 19A and 19B, it can be seen that when an arbitrary refocused image is generated, if the pupil area of the imaging optical system 101 through which the light beam incident on a pixel passes is the same for pixels, then the translation amounts for those pixels are the same. Therefore, the operation of a pixel in generating a refocused image is determined according to the pupil area of the imaging optical system 101 through which the light beam incident on the pixel passes.

Subsequently, a method of adjusting the depth of field will be described. In the configuration of the image pickup optical system of FIG. 13, images of the same position on the object plane 201 are shot by using three pixels (nine pixels in two dimensions) as mentioned above. For example, in this case, by performing the reconstruction process using all the three pixels (nine pixels in two dimensions), an image of the shallowest depth of field in the imaging optical system 101 in a state illustrated in FIG. 13 can be reconstructed. When an image having a deep depth of field is generated, the reconstruction process may be performed using, e.g., only one pixel in the center, not all the three pixels. As a result, only the light beam passing through the center and its vicinity of the pupil of the imaging optical system 101 can be selected to generate an image, without using the entire pupil of the imaging optical system 101. Thus, the same effect as produced by stopping down the aperture stop of the imaging optical system 101 can be obtained. The virtual F-number determined by this selection of light beams corresponds to the virtual depth of field described in the above steps. The same applies to off-axis light beams as well as the axial light beam.

In the image pickup optical system illustrated in FIG. 13, the images of the same position on the object plane 201 are shot only by using three pixels. Hence, when adjusting the depth of field as described above, there are only two options, either the three pixels being used or only one pixel in the center being used. However, the depth of field can also be adjusted to one between the two. In this case, by changing the weighting of pixels to be used, the depth of field is adjusted. For example, with using one pixel in the center as it is, by weighting the two outer pixels with 0.5 with respect to the pixel in the center so as to be used in the reconstruction process, an intermediate depth of field could also be achieved.

Subsequently, a method of changing the exposure will be described. As mentioned above, in generating the refocused image, by translating pixel values obtained by the image pickup element 103 to the virtual imaging plane 203 to combine them, the refocused image at a desired focus position can be generated. In this example, three pixel values are translated to be combined, and by multiplying by (applying) coefficients like correction values when combining them, the luminance values of the pixels when combined can be controlled. If the pixel values are multiplied by the same correction value across the entire image, the brightness of the entire image can be changed. Alternatively, by multiplying only a specific pixel (or pixels) by a correction value, the brightness of only the specific area can be changed. As such, by multiplying by correction values, the brightness can be changed as if the exposure were actually changed. The brightness determined by multiplying by correction values corresponds to the virtual exposure described above.

Subsequently, the value of the coefficient Q in the Expression (5) mentioned above will be described. In the case of the image pickup apparatus (the image pickup optical system) of the present embodiment, the lens array 102 is disposed at the image-side conjugate plane of the imaging optical system 101 with respect to the object plane 201. Hence, it is equivalent to an image of the object plane 201 formed by the imaging optical system 101 being sampled by the lens array 102. With respect to this, it is explained that the two-dimensional spatial resolution is reduced to ⅑ of that of an image pickup apparatus which obtains only the two-dimensional intensity distribution of light, as described previously. When symbol $L_{1p}$ is a pitch of the lens array 102, the coefficient Q and $\Delta x_p$ are represented by the following Expressions (6) and (5a), respectively.

$$Q = s_p / L_{1p} \quad (6)$$

$$\Delta x_p = (s_p / L_{1p}) \times (\Delta x_r / s_p) = \Delta x_r / L_{1p} \quad (5a)$$

Figure 24:
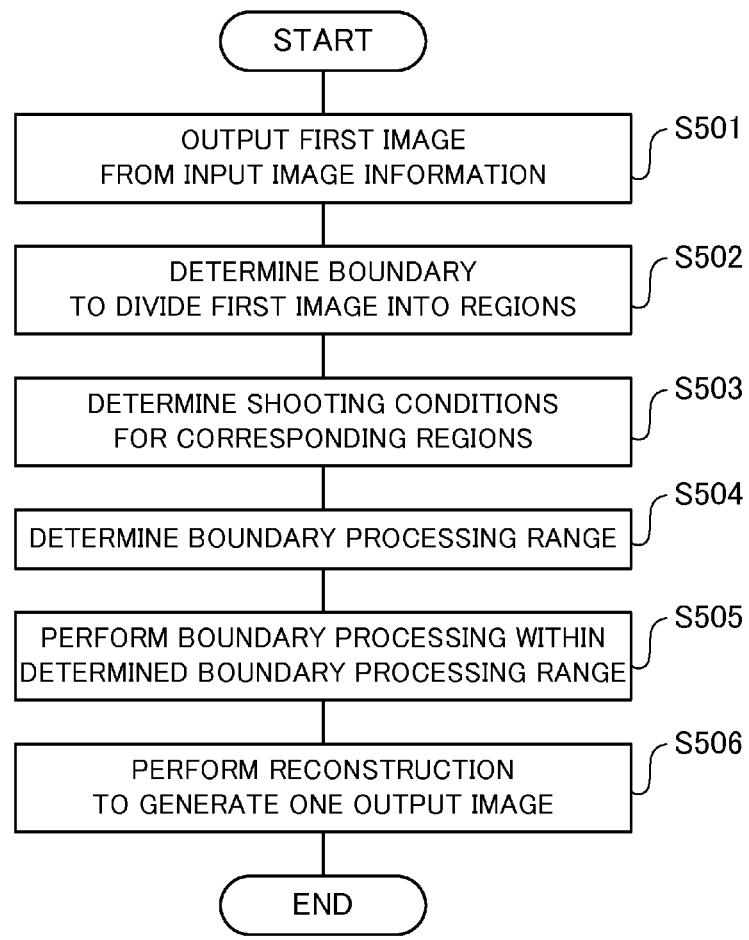
FIG. 24 is a flow chart of an image processing method in each of Embodiments 1 to 5.

Subsequently, referring to FIG. 24, the image processing method in the present embodiment will be described. FIG. 24 is a flow chart of the image processing method in the present embodiment. Each step in FIG. 24 is executed by the image processing unit 105 based on the instruction of the system controller 111.

The image processing unit 105 has a region dividing unit 105a and a reconstructed image generating unit 105b. The region dividing unit 105a divides the input image (a first image) generated based on the input image information into a plurality of regions (first and second regions). The reconstructed image generating unit 105b applies different shooting conditions from each other to the first and second regions respectively, thereby reconstructing the input image information to generate an output image. Preferably, the region dividing unit 105a of the image processing unit 105 includes a boundary determining unit 1051a, a shooting condition determining unit 1051b, a boundary processing range determining unit 1051c, and a boundary processing unit 1051d. The boundary determining unit 1051a determines the boundary that divides an image into the first and second regions. The shooting condition determining unit 1051b determines shooting conditions for the first and second regions, respectively. The boundary processing range determining unit 1051c determines the boundary processing range. The boundary processing unit 1051d performs boundary processing for the boundary processing range.

Preferably, the boundary processing range determining unit 1051c calculates a spread amount of the blur when, with the shooting condition for the first or second region being applied, the object image changes due to the object image of the first or second region being blurred. The spread amount of the blur is a spread amount of the blur between before and after the change in the object image, which is calculated based on the shooting conditions. Then, the boundary processing range determining unit 1051c determines a boundary processing range based on the spread amount of the blur.

Preferably, the boundary processing unit 1051d applies, to the boundary processing range, a shooting condition between the shooting conditions for the first and second regions adjacent to each other through the boundary processing range so as to perform boundary processing.

First, in step S501 in FIG. 24, the first image (the input image) is generated from the input image information (information of a plurality of viewpoint images) to be outputted. Subsequently, in step S502, a boundary to divide the first image into regions (the first and second regions) is determined. Then, in step S503, shooting conditions for the respective regions are determined. And in step S504, a boundary processing range is determined. Subsequently, in step S505, the boundary processing is performed for the determined boundary processing range. Then, in step S506, reconstruction is performed to generate one output image. As a result, with applying different shooting conditions to the plurality of regions respectively in one image, a reconstructed image can be generated.

Embodiment 2

Next, Embodiment 2 of the present invention will be described. The basic configuration of an image pickup apparatus in the present embodiment is the same as that of the image pickup apparatus 100 of Embodiment 1 described with reference to FIG. 18, and hence description thereof is omitted.

Figure 14:
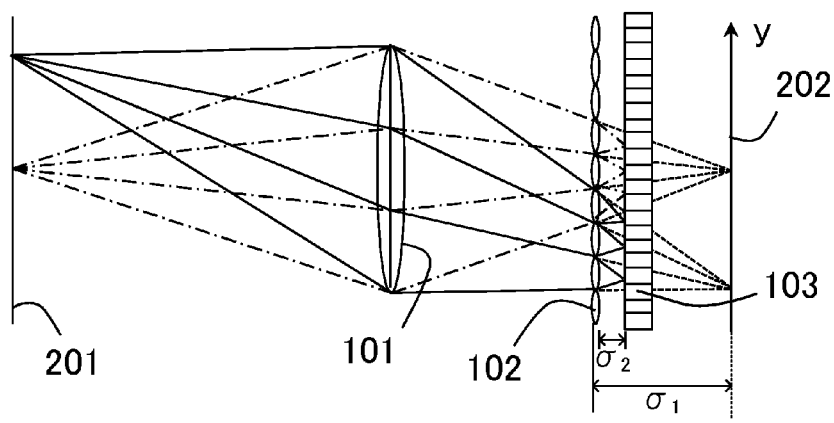
FIG. 14 is a schematic configuration diagram of an image pickup optical system in Embodiment 2.

First, referring to FIG. 14, the configuration of the image pickup optical system in the present embodiment will be described. FIG. 14 is a schematic configuration diagram of the image pickup optical system. The lens array 102 is disposed on the object side relative to the image-side conjugate plane 202 of the imaging optical system 101 with respect to the object plane 201. The lens array 102 is disposed such that the image-side conjugate plane 202 of the imaging optical system 101 with respect to the object plane 201 becomes conjugate with the image pickup element 103 (in a conjugate relation). Rays from the object plane 201 pass through the imaging optical system 101 and the lens array 102, and then are incident on different pixels of the image pickup element 103 according to the position and angle of the ray on the object plane 201, and thus object space information (light field) is obtained. Rays from the same position on the object plane 201 pass through different pupil areas of the imaging optical system 101 according to the angle of the ray of light relative to the object plane 201. As a result, the image pickup element 103 obtains an image in which a plurality of small images different in shooting viewpoint and shooting range are arranged.

The image pickup optical system illustrated in FIG. 14 is reduced in spatial resolution as compared with an image pickup optical system which obtains only the two-dimensional intensity distribution of light. This is because the lens array 102 views an image formed by the imaging optical system 101 as a virtual object and further-reduction images it on the image pickup element 103. The reduction ratio is $|\sigma_2/\sigma_1|$ times. Here, symbol $\sigma_1$ is a distance between the image-side conjugate plane 202 and the object-side principal plane of the lens array 102, and symbol $\sigma_2$ is a distance between the image-side principal plane of the lens array 102 and the image pickup element 103. Thus, the two-dimensional spatial resolution of the image pickup optical system illustrated in FIG. 14 is $(\sigma_2/\sigma_1)^2$ times that of an image pickup optical system which obtains only the two-dimensional intensity distribution of light.

Figure 20A:
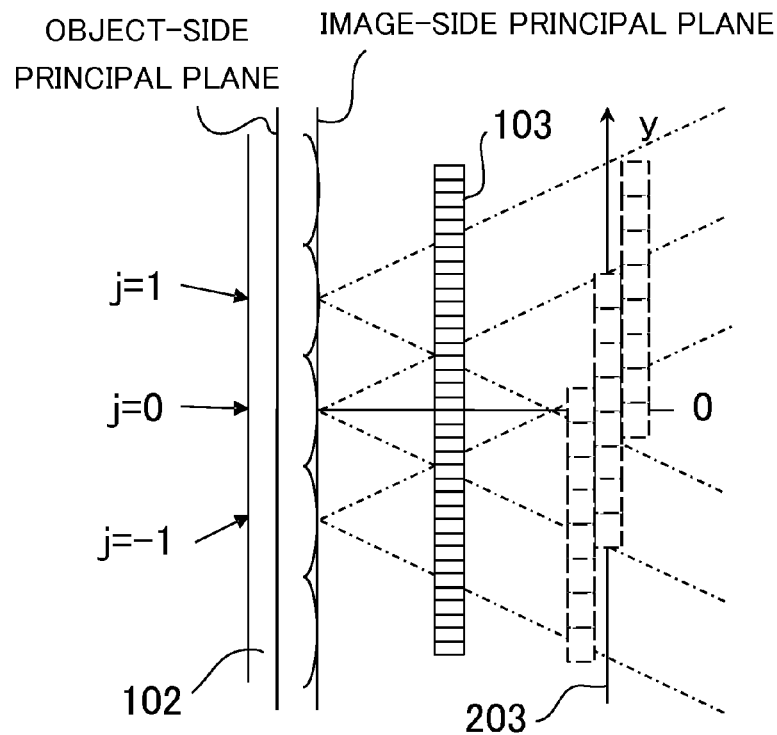
FIGS. 20A and 20B are diagrams of describing generation of a refocus image in each of Embodiments 2 and 3.
Figure 20B:
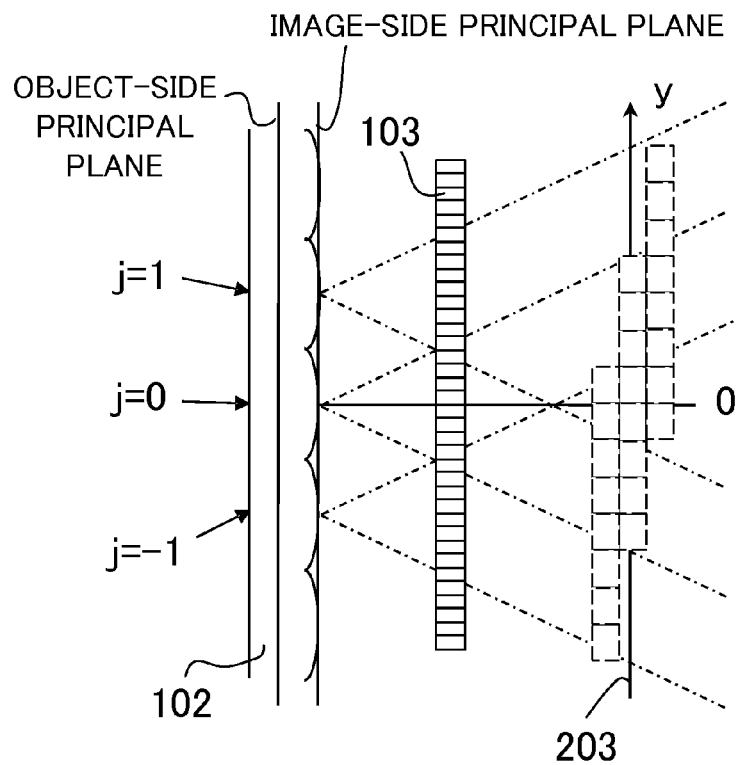

Next, referring to FIGS. 20A and 20B, a method of generating a refocused image in the present embodiment will be described. FIGS. 20A and 20B are detailed diagrams of the lens array 102 and the image pickup element 103 in the configuration of the image pickup optical system illustrated in FIG. 14. In the present embodiment, the lens array 102 includes small lenses whose surface on the object side is a plane and whose surface on the image side is in a convex shape. Similarly to Embodiment 1, the shape of the lens array 102 is not limited to this.

The angle of view of each small lens is indicated by a dot-dashed line in FIGS. 20A and 20B. The pixel values obtained by the image pickup element 103 are projected onto the virtual imaging plane 203 via small lenses corresponding to the pixels to be combined, thereby generating a refocused image in which the virtual imaging plane 203 is in focus. For example, in order to generate an image in which the object plane 201 in FIG. 14 is in focus, the virtual imaging plane 203 may be set at the image-side conjugate plane 202. In FIGS. 20A and 20B, the pixels projected from small lenses of lens array number j=−1 to +1 in generating a refocused image are indicated by broken lines and depicted such that they are offset from each other, which are not overlapped with each other, for easiness of understanding. The generation of a refocused image may be performed by the method which translates the pixels such that they are overlapped with each other, in the same way as with the above generating method which projects pixels to be combined. At this time, if areas of the lens array 102 through which light beams incident on pixels pass are the same, the translation amounts of those pixels are the same. As such, the operation of a pixel in generating a refocused image in the present embodiment is determined according to the area of the lens array 102 through which the light beam incident on the pixel passes.

Subsequently, a method of adjusting the depth of field will be described. In the configuration of the image pickup apparatus (the image pickup optical system) illustrated in FIG. 14, the same position on the object plane 201 is photographed with the pupil area being divided by three lenses of the lens array 102. For example, in this case, by performing reconstruction process using all the three lenses of the lens array 102, an image of the shallowest depth of field in the image pickup apparatus (the imaging optical system 101) illustrated in FIG. 14 can be generated. When an image of a deep depth of field is generated, the reconstruction process may be performed using, e.g., only one lens in the center, not all the three lenses of the lens array 102. As a result, only the light beam passing through the center and its vicinity of the pupil of the imaging optical system 101 can be used to generate an image, without using the entire pupil. Thus, the same effect as produced by stopping down the aperture stop of the imaging optical system 101 can be obtained. The virtual F-number determined by this selection of lenses of the lens array 102 corresponds to the virtual depth of field described in the above steps. The same applies to off-axis light beams as well as the axial light beam.

Also in the image pickup apparatus (the image pickup optical system) illustrated in FIG. 14, similarly to the image pickup apparatus (the image pickup optical system) illustrated in FIG. 13, by changing the weights of pixels corresponding to the lenses of the lens array 102 to be used, the depth of field can be finely adjusted. For example, with using pixels corresponding to one lens of the lens array 102 in the center as they are, the pixel values corresponding to the two outer lenses of the lens array 102 are weighted with 0.5 with respect to the lens of the lens array 102 in the center. By using the result of this in the reconstruction process, an arbitrary intermediate depth of field can also be achieved.

Subsequently, a method of changing the exposure will be described. As described above, in generating a refocused image, by projecting the pixel values obtained by the image pickup element 103 onto the virtual imaging plane 203 via small lenses corresponding to the pixels to combine them, a refocused image in which the virtual imaging plane 203 is in focus can be generated. By multiplying (applying) coefficients like correction values and pixel values corresponding to lenses of the lens array 102 respectively when combining them, the luminance values of the pixels when combined can be controlled similarly to the image pickup apparatus of Embodiment 1. If the pixel values are multiplied by the same correction value across the entire image, the brightness of the entire image can be changed. Alternatively, by multiplying only a specific pixel (or pixels) by a correction value, the brightness of only the specific area can be changed. As such, by multiplying by correction values, the brightness can be changed as if the exposure were actually changed. The brightness determined by multiplying by correction values corresponds to the virtual exposure described previously.

Subsequently, the value of coefficient Q in Expression (5) as mentioned above will be described. In the case of the image pickup apparatus (the image pickup optical system) of the present embodiment, the lens array 102 is disposed on the object side relative to the image-side conjugate plane 202 of the imaging optical system 101 with respect to the object plane 201. Further, the image-side conjugate plane 202 and the image pickup element 103 are disposed in such a way as to be in a conjugate relation via the lens array 102. Thus, images are reduced to $\sigma_2/\sigma_1$ times the original on the image pickup element 103 and sampled by the pixels on the image pickup element 103. Hence, the coefficient Q is equal to $\sigma_2/\sigma_1$ as represented by the following Expression (7). At this time, $\Delta x_p$ is represented by the following Expression (5b).

$$Q = \sigma_2/\sigma_1 \qquad (7)$$

$$\Delta x_p = (\sigma_2/\sigma_1) \times (\Delta x_i/s_p) \qquad (5b)$$

Embodiment 3

Next, Embodiment 3 of the present invention will be described. The basic configuration of an image pickup apparatus in the present embodiment is the same as that of the image pickup apparatus 100 of Embodiment 1 described with reference to FIG. 18, and hence description thereof is omitted.

Figure 15:
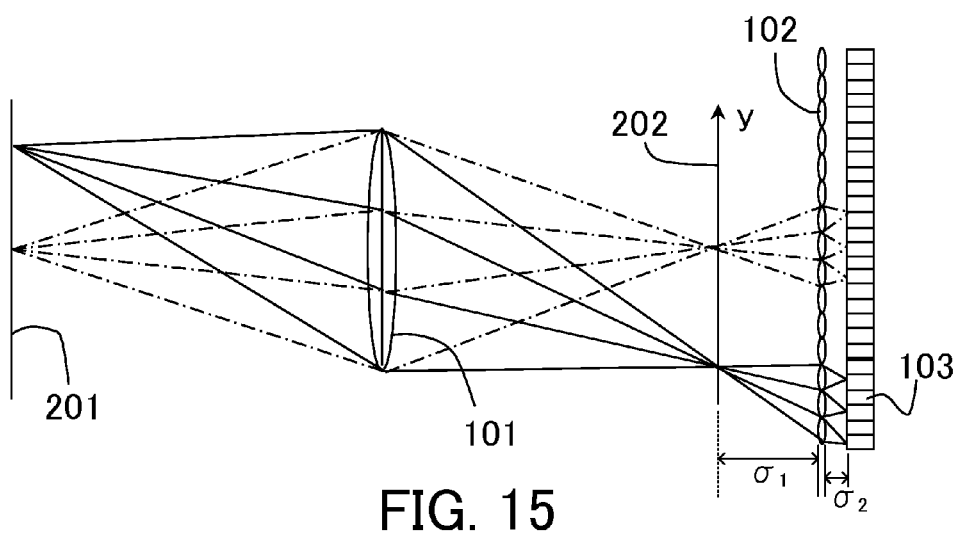
FIG. 15 is a schematic configuration diagram of an image pickup optical system in Embodiment 3.

First, referring to FIG. 15, the configuration of an image pickup optical system in the present embodiment will be described. FIG. 15 is a schematic configuration diagram of the image pickup optical system. The image pickup optical system of the present embodiment is the same as the image pickup optical system of Embodiment 2 except that the lens array 102 is disposed on the image side relative to the image-side conjugate plane 202. The difference from the image pickup apparatus (the image pickup optical system) of Embodiment 2 is that the lens array 102 views an image formed by the imaging optical system 101 as a real object and again images it on the image pickup element 103. However, the image pickup apparatuses (the image pickup optical systems) of Embodiment 2 (FIG. 14) and the present embodiment (FIG. 15) are essentially the same because in both of them the lens array 102 views an image formed by the imaging optical system 101 as an object and forms its image on the image pickup element 103. Hence, discussion of refocus and depth-of-field adjustment for the image pickup apparatus (the image pickup optical system) of Embodiment 2 is also true of the image pickup apparatus (image pickup optical system) of the present embodiment.

Also as to the method of changing the exposure, control can be performed in the same way as with the image pickup apparatus (the image pickup optical system) of Embodiment 2, and hence description thereof is omitted. Expression (5b) is applicable to the value of the coefficient Q in Expression (5).

Embodiment 4

Figure 21:
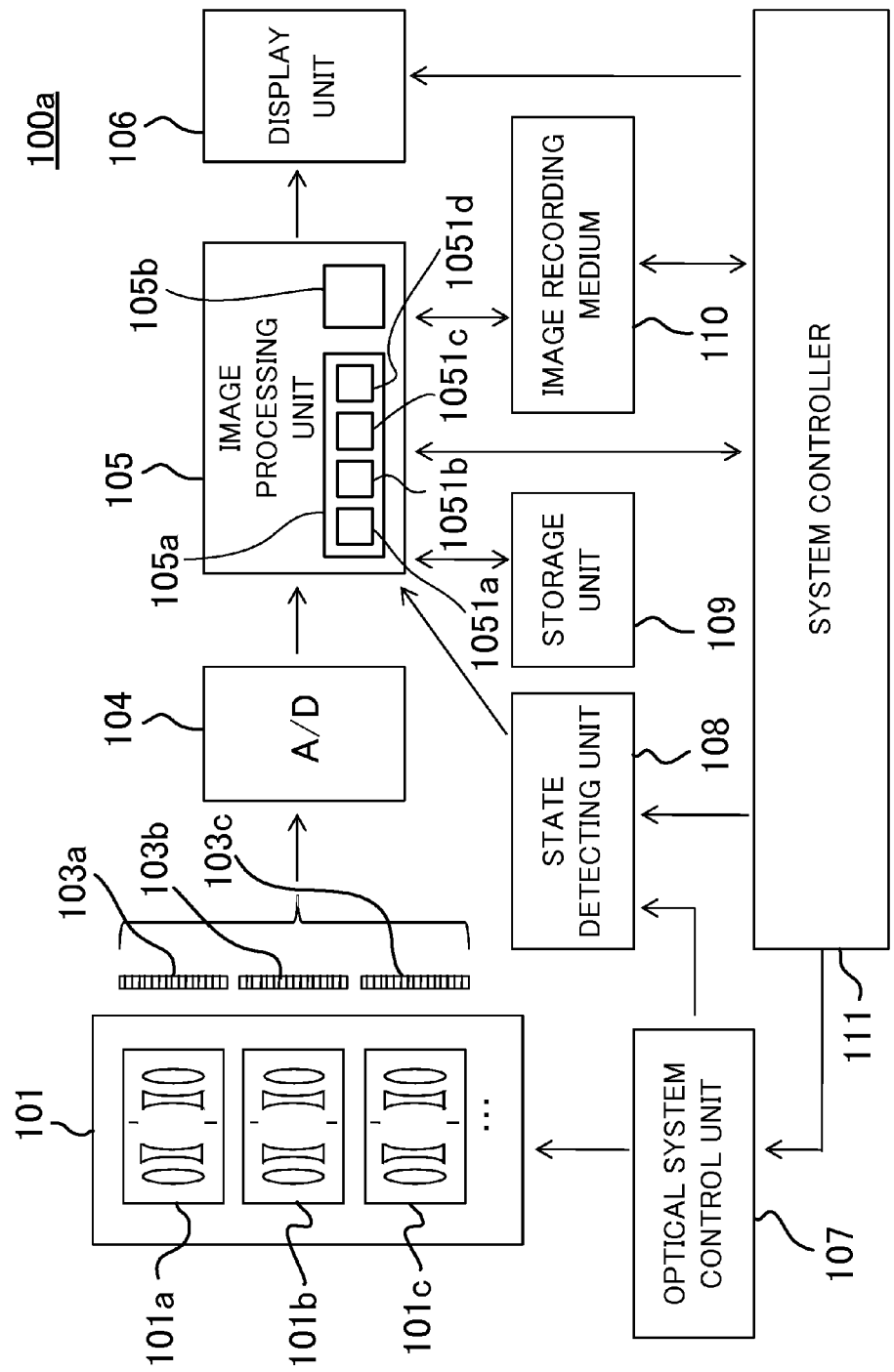
FIG. 21 is a block diagram of an image pickup apparatus in Embodiment 4.

Next, Embodiment 4 of the present invention will be described. FIG. 21 is a block diagram of an image pickup apparatus 100a in the present embodiment. The configuration of the image pickup apparatus 100a is the same as that of the image pickup apparatus 100 of FIG. 18 except for the imaging optical system 101, the lens array 102, and the image pickup element 103.

Figure 22:
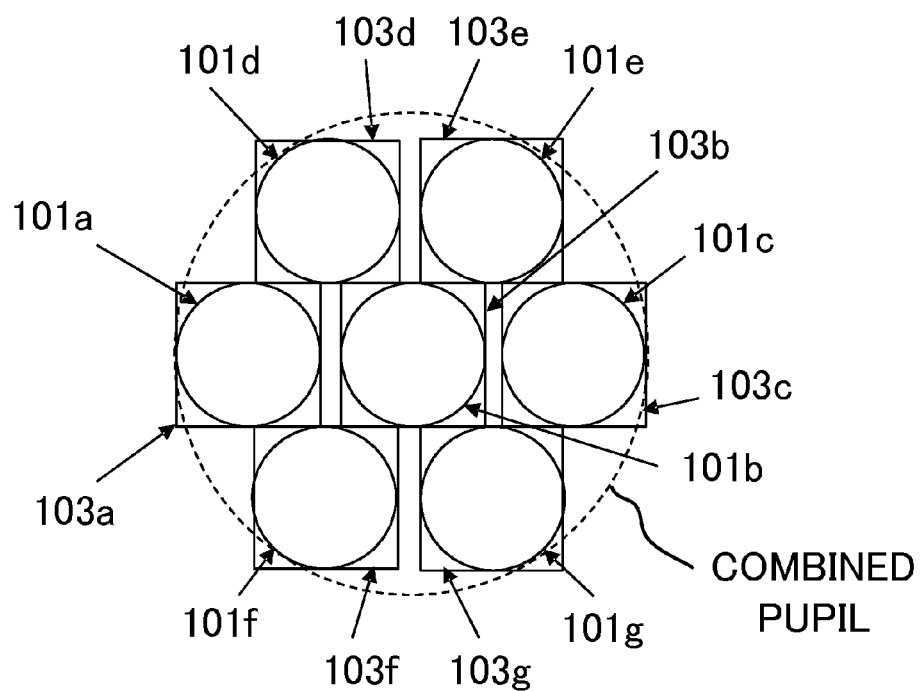
FIG. 22 is a schematic configuration diagram of an image pickup optical system in Embodiment 4.

FIG. 25 is a schematic configuration diagram of the image pickup optical system in the present embodiment, which is a diagram when viewing the imaging optical system 101 from the object side. In FIG. 21, rays from the object space (not shown) are incident on the imaging optical system 101. The imaging optical system 101 includes a plurality of optical systems 101a to 101g having positive refractive power as illustrated in FIG. 22. The imaging optical system 101 is in a configuration having sixfold symmetry with an optical axis of the optical system 101b as a rotation axis. The configuration of the imaging optical system 101 is not limited to this, but the number and arrangement of optical systems can be changed as needed. Image pickup elements 103a to 103g are arranged on the image side of the optical systems 101a to 101g, respectively. In the present embodiment, it is not essential to includes the plurality of image pickup elements 103a to 103g, but the image pickup optical system may includes a single image pickup element if it can receive images formed by the optical systems 101a to 101g. Thus, the image pickup apparatus of the present embodiment may have at least one image pickup element.

Figure 16:
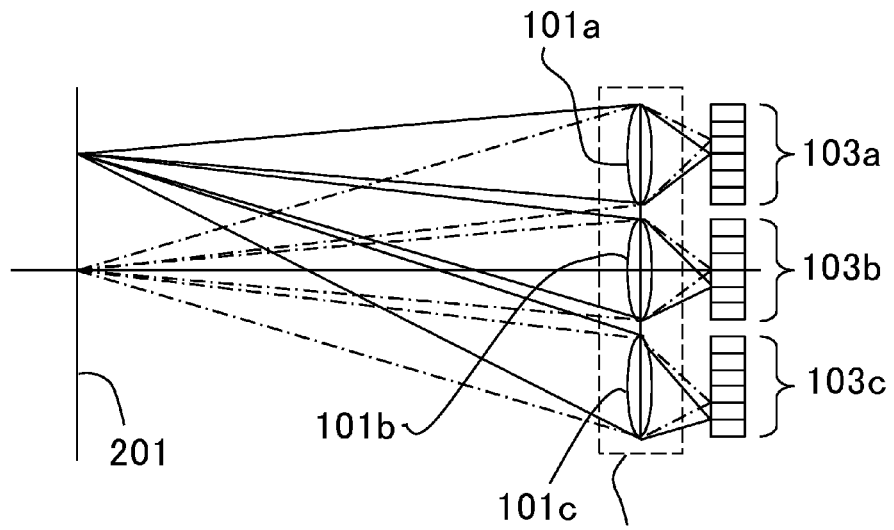
FIG. 16 is a schematic configuration diagram of an image pickup optical system in Embodiment 4.

FIG. 16 is a schematic diagram of the image pickup optical system of the present embodiment, which is a cross section including the optical axes of the optical system 101a to 101c. Rays refracted by the optical systems 101a to 101c are received by the corresponding image pickup elements 103a, 103b, and 103c, respectively. A plurality of images obtained by the image pickup elements 103a, 103b, and 103c are parallax images when the object space is observed from different viewpoints. By combining the plurality of images, the two-dimensional intensity distribution of light and angle information in the object space, that is, object space information (the light field) can be obtained. In the present embodiment, the plurality of parallax images are the input image. By the way, in the configuration illustrated in FIG. 16, if the number of all the pixels of the image pickup element in use is the same, the resolution is reduced as compared with an image pickup system which obtains only the two-dimensional intensity distribution of light. This is because some pixels need to be dedicated to obtaining angle components of object space information.

Figure 23A:
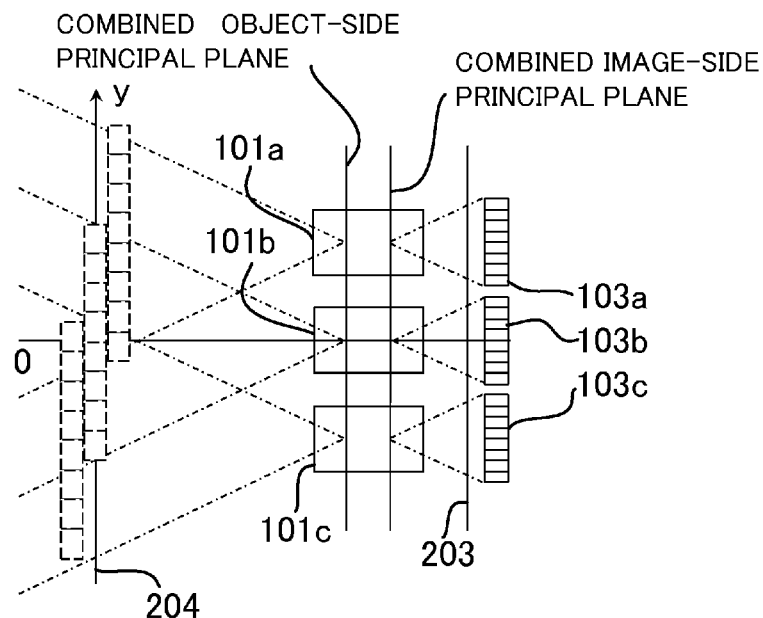
FIGS. 23A and 23B are diagrams of describing generation of a refocus image in Embodiment 4.
Figure 23B:
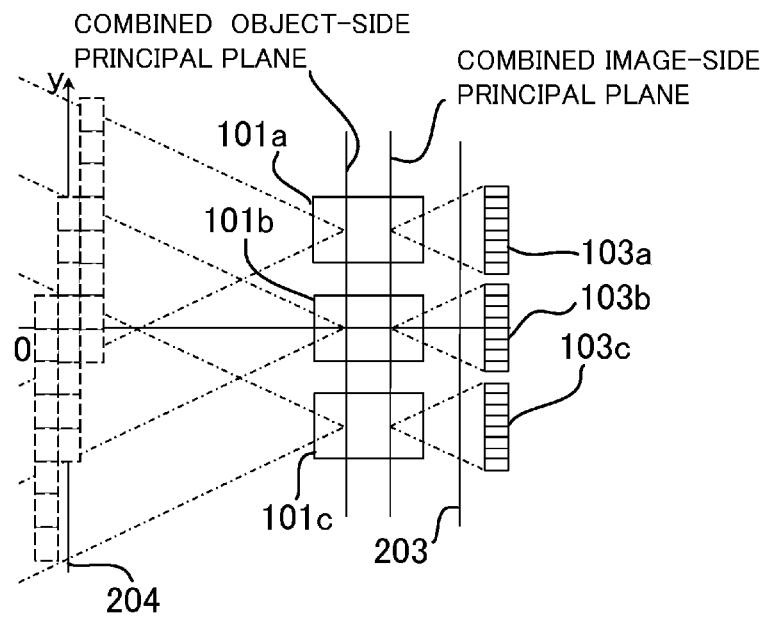

Subsequently, a method of generating a refocused image in the present embodiment will be described. FIGS. 23A and 23B are diagrams of describing the generation of a refocused image, which are detailed diagrams of the configuration of FIG. 16. The combined object-side principal plane in FIGS. 23A and 23B is defined to be a plane extending through the respective object-side principal points of the optical systems 101a to 101g. Similarly, the combined image-side principal plane is a plane extending through the respective image-side principal points of the optical systems 101a to 101g. The object-side principal plane and the image-side principal plane of the imaging optical system 101 are denoted by the combined object-side principal plane and the combined image-side principal plane, respectively, in the image pickup apparatus 100a illustrated in FIG. 21. The angle of view of each optical system is indicated by a dot-dashed line in FIGS. 23A and 23B.

When the focus position on the image side is brought onto the virtual imaging plane 203, pixel values obtained by the image pickup elements 103a to 103g may be projected via the optical systems 101a to 101g corresponding to the image pickup elements 103a to 103g onto the object-side refocus plane 204 to be combined. The object-side refocus plane 204 is conjugate with the virtual imaging plane 203 via the optical systems 101a to 101g. By moving the virtual imaging plane 203, a refocused image in which focus is on an arbitrary position can be generated.

For example, in order to generate an image in which focus is on the object plane 201 of FIG. 16, the virtual imaging plane 203 may be set on the image pickup elements 103a to 103g. At this time, the object plane 201 and the object-side refocus plane 204 coincide with each other. In FIGS. 23A and 23B, projected pixels in the generation of a refocused image are indicated by broken lines and depicted such that they are offset from each other, which are not overlapped with each other, for easiness of understanding. The generation of a refocused image may be performed by the method which translates the pixels such that they are overlapped with each other, in the same way as with the above generating method which projects pixels, and combines them. At this time, if optical systems through which light beams incident on pixels pass are the same, the translation amounts of those pixels are the same. As such, the operation of a pixel in generating a refocused image in the present embodiment is determined according to the optical system through which the light beam incident on the pixel passes.

Subsequently, a method of adjusting the depth of field will be described. In the image pickup apparatus 100a illustrated in FIG. 21, the same position on the object space (not shown) is photographed with the pupil area being divided by the seven optical systems 101a to 101g. For example, in this case, by performing reconstruction process using all the seven optical systems 101a to 101g, an image having the shallowest depth of field in the imaging optical system 101 of the image pickup apparatus 100a can be generated. When an image having a deep depth of field is generated, reconstruction may be performed using, e.g., only one optical system 101b in the center, not all the seven optical systems 101a to 101g. As a result, only the light beam passing through the center and its vicinity of the pupil of the imaging optical system 101 can be used to generate an image, without using the entire pupil. Thus, the same effect as produced by stopping down the aperture stop of the imaging optical system 101 can be obtained. The virtual F-number determined by this selection of optical systems 101 corresponds to the virtual depth of field described in the above steps. The same applies to off-axis light beams as well as the axial light beam.

Also in the image pickup apparatus 100a illustrated in FIG. 21, similarly to the image pickup apparatus 100 illustrated in FIG. 13, by changing the weights of pixels corresponding to the optical systems 101a to 101g to be used, the depth of field can be finely adjusted. For example, with using pixels corresponding to one optical system 101b in the center as they are, the pixel values corresponding to the six peripheral optical systems 101a, 101c to 101g are weighted with 0.5 with respect to the optical system 101b in the center. By using the result of this in the reconstruction process, an arbitrary intermediate depth of field could be achieved.

Subsequently, a method of changing the exposure will be described. As described above, in generating a refocused image, the pixel values obtained by the image pickup elements 103a to 103g are projected onto the object-side refocus plane 204 via the optical systems 101a to 101g corresponding to the image pickup elements 103a to 103g to be combined. As a result, a refocused image in which the virtual imaging plane 203 is in focus can be generated. By multiplying (applying) coefficients like correction values and pixel values corresponding to optical systems 101 respectively when combining them, the luminance values of the pixels when combined can be controlled as with the image pickup apparatus (image pickup optical systems) of Embodiment 1. If the pixel values are multiplied by the same correction value across the entire image, the brightness of the entire image can be changed. Alternatively, by multiplying only a specific pixel (or pixels) by a correction value, the brightness of only the specific area can be changed. As such, by multiplying by correction values, the brightness can be changed as if the exposure were actually changed. The brightness determined by multiplying by correction values corresponds to the virtual exposure described previously.

Subsequently, the value of the coefficient Q in the equation (5) will be described. In the case of the image pickup apparatus (the image pickup optical system) of Embodiment 4, rays from the object space are incident on the imaging optical system 101 illustrated in FIG. 21. Although in this configuration the combined pupil of the imaging optical systems is divided to obtain object space information, the imaging optical systems 101 and the image pickup elements 103 exist independent of each other. Hence, the value of the coefficient Q is equal to 1 as represented by the following Expression (8), as with a conventional image pickup apparatus which does not obtain object space information from the plurality of viewpoints. Thus, $\Delta x_p$ is represented by the following Expression (5c).

$$Q=1 \qquad (8)$$

$$\Delta x_p = 1 \times (\Delta x_s / s_p) \qquad (5c)$$

Embodiment 5

Figure 17:
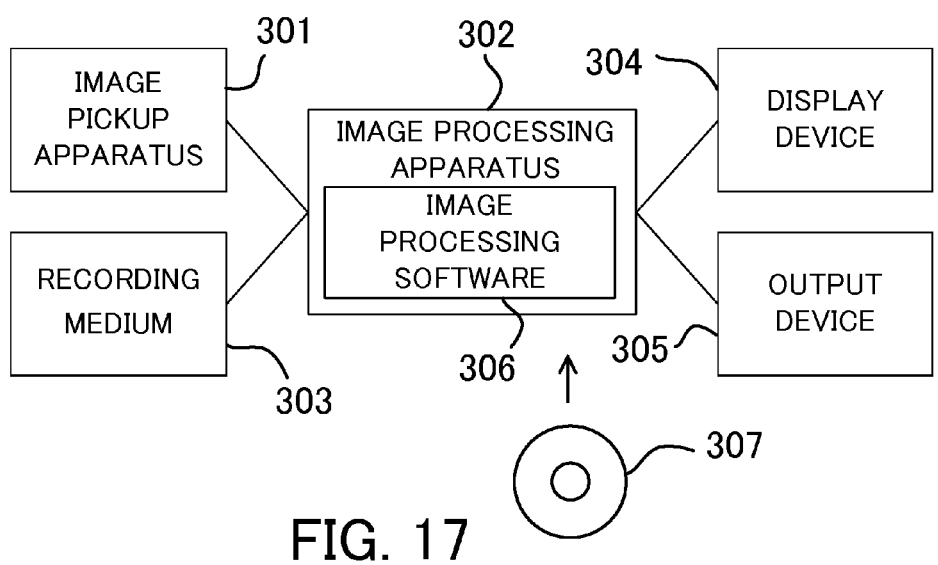
FIG. 17 is a block diagram of an image processing system in Embodiment 5.

Next, Embodiment 5 of the present invention will be described. The present embodiment describes an image processing apparatus (an image processing system) that performs the image processing method in each embodiment described above. FIG. 17 is a block diagram of an image processing system 300 in the present embodiment. The image processing apparatus of the present embodiment generates an output image using input image information including object space information obtained from a plurality of viewpoint images.

As illustrated in FIG. 17, the image processing system 300 includes an image pickup apparatus 301. The image pickup apparatus 301 includes an image pickup optical system having any of the configurations of FIGS. 13 to 16 (Embodiments 1 to 4). The image processing apparatus 302 is a computer (an information processing apparatus) that performs image reconstruction described above. The image processing apparatus 302 includes a storage unit that stores shooting condition information of the input image obtained by the image pickup apparatus 301. The image processing apparatus 302 performs a predetermined reconstruction process on this input image and outputs the processing result (the output image) to one or more of an output device 305, a display device 304, and a recording medium 303. The image processing apparatus 302 executes each of the steps of FIG. 24.

The recording medium 303 is, for example, a semiconductor memory, a hard disk, a server on a network, or the like. The output device 305 is, for example, a printer. The display device 304 is connected to the image processing apparatus 302, and a reconstructed image is inputted to the display device 304. A user can work while confirming the reconstructed image on the display device 304. Image processing software 306 (an image processing program) performs the above reconstruction process (the image processing method) and also performs a developing process or another image process as needed. The display device 304 is, for example, a liquid crystal display, projector, or the like.

The present embodiment is realized by executing the following process. That is, software (a program) that realizes the functions in the above embodiments is supplied to the system or apparatus via a network or a recording medium 307 such as a CD-ROM. Then, the computer (or CPU, MPU, etc.) of the system or apparatus reads out and execute the image processing program.

The image processing program of each embodiment may be configured to have an information processing apparatus execute the following image obtaining step, shooting condition setting step, and combining step. The image obtaining step is a step of obtaining an input image including a first image, second image, and third image shot respectively under first, second, and third shooting conditions different from each other. The shooting condition setting step is a step of setting the first shooting condition for a first region of the output image and the second shooting condition for a second region. The combining step is a step of combining the first image corresponding to the first region, the second image corresponding to the second region, and the third image corresponding to a third region between the first region and the second region and based on the third shooting condition between the first and the second shooting condition.

According to each embodiment described above, an image processing apparatus, an image pickup apparatus, image processing method, an image processing program, and a storage medium capable of generating a reconstructed image by applying different shooting conditions from each other for a plurality of regions in one image, can generate a reconstructed image can be provided. As a result, this enables controlling a background blur and the depth of field independently, which is especially effective for example when the object is a moving object or a photographer takes photographs holding it in his/her hand.

According to the image processing apparatus of each embodiment, images having a plurality of focus positions in the image can be easily obtained. Thus, in the application of this, a so-called tilt lens effect can be obtained that the virtual imaging plane position is changed continuously from the front toward the back or vice versa. When changing the virtual imaging plane position continuously to be in a curved surface shape or a free-form surface shape, the camera effect that is impossible with conventional planar image pickup elements can be expected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-026538, filed on Feb. 14, 2013, which is hereby incorporated by reference herein in its entirety.

What is claimed is:

1. An image processing apparatus which generates an output image using a captured input image including object space information containing information of a two-dimensional light intensity distribution and an angle of a ray, the image processing apparatus comprising:

a non-transitory memory storing a program; and a processor configured to execute the program stored in the non-transitory memory to implement a region dividing unit and a reconstructed image generating unit, wherein:

the region dividing unit is configured to divide an output image region into at least a first region and a second region by using the captured input image, and the reconstructed image generating unit is configured to reconstruct the captured input image based on the object space information included in the captured input image to generate the output image, the reconstructed image generating unit applying different shooting conditions from each other to the first region and the second region, respectively, after the input image is captured.

2. The image processing apparatus according to claim 1, wherein the region dividing unit comprises:

a boundary determining unit configured to determine a boundary to divide the output image region into at least the first region and the second region by using the captured input image;

a shooting condition determining unit configured to determine the shooting condition for each of the first region and the second region;

a boundary processing range determining unit configured to determine a boundary processing range between the first region and the second region; and a boundary processing unit configured to perform boundary processing for the boundary processing range so as to reduce a difference between the first region and the second region generated by the different shooting conditions from each other.

3. The image processing apparatus according to claim 2, wherein the boundary processing range determining unit calculates a spread amount of a blur corresponding to a parallax between before and after a change in an object image based on the shooting condition for one of the first region and the second region, and determines the boundary processing range based on the spread amount of the blur.

4. The image processing apparatus according to claim 2, wherein the boundary processing unit applies a shooting condition between the shooting conditions for the first region and the second region adjacent to each other through the boundary processing range to the boundary processing range so as to perform the boundary processing.

5. The image processing apparatus according to claim 1, wherein the shooting condition is a virtual depth of field.

6. The image processing apparatus according to claim 1, wherein the shooting condition is a virtual imaging plane position.

7. The image processing apparatus according to claim 1, wherein the shooting condition is a virtual exposure.

8. The image processing apparatus according to claim 1, wherein the reconstructed image generating unit is configured to apply the different shooting conditions during the image processing on the captured input image.

9. The image processing apparatus according to claim 1, wherein:

the input image including the object space information is captured by a single photographing by using an image pickup apparatus, and the output image is generated by reconstructing the captured input image based on the object space information obtained by the single photographing.

10. The image processing apparatus according to claim 1, wherein:
the shooting conditions are determined after the input image is captured, and
the reconstructed image generating unit is configured to reconstruct the captured input image by the image processing based on the shooting conditions.

11. The image processing apparatus according to claim 1, wherein the shooting conditions are changeable after the input image is captured.

12. The image processing apparatus according to claim 1, wherein the reconstructed image generating unit is configured to apply the different shooting conditions determined by using the captured input image including the object space information.

13. The image processing apparatus according to claim 1, wherein the reconstructed image generating unit is configured to reconstruct the captured input image by selecting or rearranging information of each pixel obtained from the captured input image.

14. An image pickup apparatus comprising:
an imaging optical system;
an image pickup element including a plurality of pixels;
a lens array configured such that rays from the same position of an object plane are incident on different pixels of the image pickup element depending on a pupil region of the imaging optical system through which the ray passes; and
an image processing apparatus which generates an output image using a captured input image including object space information containing information of a two-dimensional light intensity distribution and an angle of the ray, the image processing apparatus comprising:
a non-transitory memory storing a program; and
a processor configured to execute the program stored in the non-transitory memory to implement a region dividing unit and a reconstructed image generating unit, wherein:
the region dividing unit is configured to divide an output image region into at least a first region and a second region by using the captured input image; and
the reconstructed image generating unit is configured to reconstruct the captured input image based on the object space information included in the captured input image to generate the output image, the reconstructed image generating unit applying different shooting conditions from each other to the first region and the second region, respectively, after the input image is captured,
wherein the lens array is disposed in an image-side conjugate plane of the imaging optical system with respect to the object plane.

15. An image pickup apparatus comprising:
an imaging optical system;
an image pickup element including a plurality of pixels;
a lens array configured such that rays from the same position of an object plane are incident on different pixels of the image pickup element depending on a pupil region of the imaging optical system through which the ray passes; and
an image processing apparatus which generates an output image using a captured input image including object space information containing information of a two-dimensional light intensity distribution and an angle of the ray, the image processing apparatus comprising:
a non-transitory memory storing a program; and
a processor configured to execute the program stored in the non-transitory memory to implement a region dividing unit and a reconstructed image generating unit, wherein:
the region dividing unit is configured to divide an output image region into at least a first region and a second region by using the captured input image; and
the reconstructed image generating unit is configured to reconstruct the captured input image based on the object space information included in the captured input image to generate the output image, the reconstructed image generating unit applying different shooting conditions from each other to the first region and the second region, respectively, after the input image is captured,
wherein the lens array is disposed such that the image pickup element is conjugate with an image-side conjugate plane of the imaging optical system with respect to the object plane.

16. An image pickup apparatus comprising:
an imaging optical system including a plurality of optical systems having a positive refractive power;
at least one image pickup element including a plurality of pixels; and
an image processing apparatus which generates an output image using a captured input image including object space information containing information of a two-dimensional light intensity distribution and an angle of the ray, the image processing apparatus comprising:
a non-transitory memory storing a program; and
a processor configured to execute the program stored in the non-transitory memory to implement a region dividing unit and a reconstructed image generating unit, wherein:
the region dividing unit is configured to divide an output image region into at least a first region and a second region by using the captured input image; and
the reconstructed image generating unit is configured to reconstruct the captured input image based on the object space information included in the captured input image to generate the output image, the reconstructed image generating unit applying different shooting conditions from each other to the first region and the second region, respectively, after the input image is captured,
wherein the plurality of optical systems are arrayed such that rays from the same position of an object plane are incident on different pixels of the image pickup element depending on a pupil region of the imaging optical system through which the ray passes, and
wherein a pupil of the imaging optical system is a combined pupil that is obtained by combining pupils of the plurality of optical systems.

17. An image processing method which generates an output image using a captured input image including object space information containing information of a two-dimensional light intensity distribution and an angle of a ray, the image processing method comprising the steps of:
dividing an output image region into at least a first region and a second region by using the captured input image; and
reconstructing the captured input image based on the object space information included in the captured input image to generate the output image, the captured input image being reconstructed by applying different shooting conditions from each other to the first region and the second region, respectively, after the input image is captured.

18. The image processing method according to claim 17, wherein the step of dividing the output image region into at least the first region and the second region by using the output image comprises the steps of:
   determining a boundary to divide the output image region into at least the first region and the second region by using the captured input image;
   determining the shooting condition for each of the first region and the second region;
   determining a boundary processing range between the first region and the second region; and
   performing boundary processing for the boundary processing range so as to reduce a difference between the first region and the second region generated by the different shooting conditions from each other.

19. A non-transitory computer-readable storage medium storing an image processing program which generates an output image using a captured input image including object space information containing information of a two-dimensional light intensity distribution and an angle of a ray, the image processing program causing an information processing apparatus to execute the steps of:
   dividing an output image region into at least a first region and a second region by using the captured input image; and
   reconstructing the captured input image based on the object space information included in the captured input image to generate the output image, the input image being reconstructed by applying different shooting conditions from each other to the first region and the second region, respectively, after the input image is captured.

20. The non-transitory computer-readable storage medium according to claim 19, wherein the step of dividing the output image region into at least the first region and the second region by using the captured input image comprises the steps of:
   determining a boundary to divide the output image region into at least the first region and the second region by using the captured input image;
   determining the shooting condition for each of the first region and the second region;
   determining a boundary processing range between the first region and the second region; and
   performing boundary processing for the boundary processing range so as to reduce a difference between the first region and the second region generated by the different shooting conditions from each other.

* * * * *